(12) United States Patent
Bader

(10) Patent No.: US 10,450,212 B1
(45) Date of Patent: Oct. 22, 2019

(54) TREATMENT OF SOURCE WATER

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 246 days.

(21) Appl. No.: 15/731,462

(22) Filed: Jun. 12, 2017

Related U.S. Application Data

(63) Continuation-in-part of application No. 13/999,309, filed on Feb. 8, 2014, now Pat. No. 9,701,558.

(60) Provisional application No. 62/601,724, filed on Mar. 29, 2017.

(51) Int. Cl.
| | | |
|---|---|---|
| B01D 21/00 | (2006.01) | |
| C02F 3/12 | (2006.01) | |
| B01D 21/02 | (2006.01) | |
| C02F 1/00 | (2006.01) | |
| C02F 3/00 | (2006.01) | |

(52) U.S. Cl.
CPC ............ *C02F 3/12* (2013.01); *B01D 21/02* (2013.01); *C02F 1/00* (2013.01); *C02F 3/006* (2013.01); *B01D 21/00* (2013.01); *C02F 3/00* (2013.01); *C02F 2001/007* (2013.01); *C02F 2301/02* (2013.01); *C02F 2303/24* (2013.01)

(58) Field of Classification Search
USPC ........ 210/640, 729, 711, 712, 650, 652, 371
See application file for complete search history.

(56) References Cited

U.S. PATENT DOCUMENTS

| | | | |
|---|---|---|---|
| 6,365,051 B1 | 4/2002 | Bader | |
| 6,663,778 B1 * | 12/2003 | Bader | B01D 61/147 210/640 |
| 7,501,065 B1 * | 3/2009 | Bader | B01D 61/025 210/652 |
| 7,789,159 B1 * | 9/2010 | Bader | B01D 61/04 166/371 |
| 7,934,551 B1 | 5/2011 | Bader | |
| 7,963,338 B1 | 6/2011 | Bader | |
| 8,197,696 B1 * | 6/2012 | Bader | C02F 1/66 210/639 |

(Continued)

OTHER PUBLICATIONS

U.S. Appl. No. 62/601,724, Mar. 29, 2017, Bader.
U.S. Appl. No. 13/999,309, Feb. 8, 2014, Bader.
U.S. Appl. No. 14/545,681, Jun. 6, 2015, Bader.

*Primary Examiner* — Nina Bhat

(57) ABSTRACT

There is provided herein a system and method for de-toxifying and de-scaling source water. In some embodiments, source water will be mixed with either an aluminum source or an iron source to separate endotoxins from acidic proteins and convert the naturally present bicarbonate in source water to carbon dioxide. Endotoxins and carbon dioxide will then be removed from source water by a stage of hydrophobic membranes to produce de-toxified and de-carbonated source water. Calcium hydroxide will be mixed with the de-toxified and de-carbonated source water to form precipitates comprising foulants and sulfate. A recoverable and reusable amine solvent will also be used to induce efficient precipitation. Possible reuse applications for the treated source water by the inventive methods that minimize excessive uses of potable water may include hydro-fracturing of shale and sand formations and heavy oil recovery by steam injection.

25 Claims, 7 Drawing Sheets

(56) References Cited

U.S. PATENT DOCUMENTS

| | | | | |
|---|---|---|---|---|
| 8,915,301 B1* | 12/2014 | Bader | ................... | C02F 9/00 |
| | | | | 166/371 |
| 9,701,558 B1* | 7/2017 | Bader | ................... | C02F 9/00 |
| 9,751,777 B1* | 9/2017 | Bader | ................... | C02F 1/40 |
| 2013/0075335 A1* | 3/2013 | Prakash | ............... | C02F 1/463 |
| | | | | 210/640 |
| 2016/0145132 A1* | 5/2016 | Ukai | ............... | C02F 1/46104 |
| | | | | 210/667 |

* cited by examiner

TREATMENT OF SOURCE WATER

BACKGROUND OF THE INVENTION

Domestic Wastewater

Effluent Streams from Wastewater Treatment Plants (WWTP)

Domestic wastewater has diverse characteristics that vary by place and season. The composition of wastewater comprises inorganics, organic acids, microbes, and traces of priority and emerging organic pollutants. WWTP may include: (1) a gathering and preliminary processing step for sewage influent; (2) a secondary step to degrade biodegradable species; (3) a filtration step to roughly polish the effluent; and (4) a disinfection step to reduce microbes' activities. The secondary step is biological, which may be based on an activated sludge system, an aerobic granular sludge system, a bio-membranes system, or other methods. Regardless of the nature of the biological step, WWTP partially remove contaminants. As a result, effluent streams from WWTP cannot be directly used without further treatment, and thus they are often discharged into receiving surface waters. Among the species of concern in effluent streams are organic content (OC), total phosphorus (TP), boron, and traces of transition metals.

OC comprises natural organic materials (NOM), trace organic materials (TOM), and microbially produced organic materials (POM). NOM are originated from drinking water, which is the main source of domestic wastewater. NOM are typically dominated by humic substances. TOM include traces of various priority and emerging organic pollutants such as endocrine disrupting compounds (EDC), pharmaceutically active compounds (PAC), personal care products (PCP) and disinfection by-products (DBP).

POM comprise extracellular polymeric substances (EPS). The formation of ESP may be controlled by different mechanisms including active cells secretion, cells shedding, cells dissolution and hydrolysis, and adsorption from a surrounding environment. EPS matrices retain water, stick to surfaces, aggregate bacterial cells, stabilize aggregated structures, provide protective barriers for bacterial cells, absorb exogenous organics, accumulate enzymatic activities to digest exogenous organics for nutrient possession, and bind with some polyvalent ions. As such, EPS are associated with both the solid phase as insoluble materials (e.g., colloids, slimes, and macro-molecules) and the liquid phase as soluble materials (e.g., dissolved micro-molecules smaller than 0.45 µm).

The bulk of OC is biodegradable. The time to biodegrade OC varies with the ability of bacteria to ingest it. Species with small molecular weights may be removed from wastewater immediately via the biological step. Their removal may be completed in 1-2 hours. This group of readily biodegradable species may be classified as "soft" organics. However, higher molecular weight species will take several hours to be degraded and removed. Yet, other species are more recalcitrant (e.g., EPS), and may still be present in effluent streams after several days. Such less readily biodegradable species are of a particular interest since they are challenging to biodegrade. Thus, OC in general, but it is EPS content in particular, may be the most controlling factor in the biological step.

OC is also a controlling factor in discharging effluent streams into receiving surface waters. Excess OC and TP (as a nutrient) in discharged effluent streams cause primary producers (e.g., algae, plankton and aquatic plants) in receiving surface waters to flourish. Primary producers pump oxygen into surface waters during the day but at night they remove oxygen. If "night-time" oxygen removal outpaces "day-time" oxygen replenishment, dissolved oxygen would be depleted. This process causes rapid aging of receiving waters (eutrophication), and takes place in receiving surface waters often far down streams from where effluent streams are discharged. Oxygen depletion in receiving surface waters also takes place when secondary producers (decomposers of primary producers) remove oxygen faster than it can be replaced. Excess OC is usually the cause of this sudden flourishing of decomposers. The depletion of dissolved oxygen due to microbial blooms in this case takes place close to discharging points of effluent streams. In either situation, aquatic life die once dissolved oxygen in receiving surface waters is depleted at a given time.

As such, either reusing or discharging effluent streams from WWTP are of concern. In order to control the biological step within WWTP that controls the quality of effluent streams and/or to measure the oxygen depletion rate in receiving surface waters as a result of discharging effluent streams, some knowledge of OC load is essential. OC load is typically measured by three conventional parameters: total organic carbon (TOC); chemical oxygen demand (COD); and biochemical oxygen demand (BOD). Based on the inventor's experience in treating domestic wastewater, FIG. 1 shows the relation among such parameters as related to OC.

One of the methods to measure OC is the total carbon (TC). TC is divided into two contents; inorganic carbon (IC) and TOC. TC may be commonly analyzed by two basic steps. In the first step, the IC content is removed by acidifying (converting alkalinity to carbon dioxide) and purging the sample to measure it's released $CO_2$ as IC. However, the sample purging not only removes the released carbon dioxide from the IC content but also removes volatile and semi-volatile organics. In the second step that follows the first one, the OC content may be chemically oxidized to measure it's released $CO_2$ as TOC. However, the oxidation efficiency varies with the makeup of OC in the sample. Persulfate, for example, can chemically oxidize many organics but the oxidation is very slow and time consuming (a trial-error procedure) since the molecular structures of the OC makeup in the sample is stoichiometricly unknown to predetermine the proper oxidation time and/or the proper concentration of the oxidant. More importantly, persulfate oxidizes organic acids (the overwhelming portion of OC) very slowly and their oxidation is far from complete. Further, the oxygen content of the released carbon dioxide from oxidizing OC is likely water derived since only a minor fraction of organic acids may be oxidized. As such, IC content in domestic wastewater is always far higher than TOC content due to accurate accounts for alkalinity but may also be due to a poor quantification of OC (e.g., purging of volatile and semi-volatile organics and incomplete oxidation of organic acids).

OC can also be measured indirectly by quantifying the amount of oxygen needed to chemically or biochemically (micro-organisms) oxidize OC. One of the basic measurements is oxygen demand, which is the total amount of oxygen required to aerobically degrade OC. Oxygen demand is further divided into COD and BOD. COD measures the amount of oxygen needed to chemically oxidize OC. BOD measures the amount of oxygen needed to biochemically oxidize OC. However, biochemical oxidation is a very slow process and theoretically takes an infinite time to reach completion. As such, ultimate BOD ($BOD_u$) is measured by allowing the test to run as long as dissolved oxygen can be removed from the sample (generally 30-60 days). However, the most widely measured BOD is truncated after 5 days ($BOD_5$), which may correspond to about 55-70% completion of biochemical oxidation. $BOD_5$ may be, to some extent, useful to measure the oxygen depletion rate in receiving waters caused by discharging effluent streams from WWTP. But in order to measure the efficiency of the biological step within WWTP where knowledge of the influent's organic load is required in a short period of time, $BOD_5$ is even of a more limited value because of the required 5-days to make the measurement. Thus, short-term BOD ($BOD_{ST}$) that can be carried out in a short time (e.g., 30 minutes to several hours) may deficiently be used, instead of $BOD_5$, to measure the influent's organic load.

Reject Streams from Wastewater Treatment & Reclamation Plants (WWTRP)

Since reusing and/or discharging effluent streams from WWTP into surface waters pose health and environmental risks, their reclamation is imperative. In addition, water shortage in some regions made their reclamation a necessity to alleviate water stress. However, one of the crucial health issues in reclaiming effluents streams from WWTP is the existence of EPS (e.g., carriers for endotoxins). Knowing that it is not possible to control EPS in the biological step, the removal of such pollutants from effluents streams is critical to prevent contamination of potable water resources. Thus, the integration of pressure-driven hydrophilic membranes with WWTP has gained some attention to further reclaim effluent streams from WWTP.

WWTRP are based on integrating WWTP with hydrophilic membranes as a reclamation part. The reclamation part may include microfiltration (MF) or ultra-filtration (UF) in conjunction with reverse osmosis (RO) or nanofiltration (NF) to improve the quality of effluent steams from WWTP. All of such membranes (MF, UF, NF, and RO) are hydrophilic. MF, UF and RO reject species larger than their membranes pores sizes ("size exclusion") whereas NF rejects species based on both it is membrane charge and pore size ("charge and size exclusion"). UF or MF, as porous hydrophilic membranes, is aimed at removing colloids, suspended particles and pathogens including presumably bacteria, protozoan cysts and viruses. RO or NF, as tighter hydrophilic membranes, is aimed at the removal of dissolved inorganics (NF partially removes monovalent ions and some divalent cations), transition metals, phosphate, and some of boron and dissolved OC.

Based on the inventor's experience in treating domestic wastewater, FIG. 2 depicts a possible hypothetical flow diagram for a WWTRP. The WWTRP consists of: (1) a pre-treatment setup that may include sewage collection, screening, de-gritting/de-greasing, and chlorinating/de-aerating; (2) a biological setup that may be based on activated sludge and sedimentation tanks; (3) an effluent stream gathering setup that may include collection tanks and screening; and (4) a reclamation setup that may be based on either MF or UF in conjunction with either RO or NF.

Product streams from WWTRP are usually diverted for "indirect potable uses" and/or "direct non-potable uses". The "indirect potable uses" may include: (1) storing water in groundwater aquifers for future use, replenishing groundwater aquifers, and/or mitigating seawater intrusion to coastal groundwater aquifers; and (2) blending with drinking water-supply resources (groundwater, rivers, lakes, etc.) before such resources undergo further treatment.

The "direct non-potable uses" may include: (1) irrigation; (2) replacing potable water as a feed water for cooling towers or as a make-up water for utility boilers; and (3) replacing potable water as source water that undergo further treatment to produce ultra-pure water for applications such as nuclear power plants, semiconductors and electronics.

However, the reclamation of effluent streams by such hydrophilic membranes is not widely accepted by many regulating agencies despite their operations of many years for two critical reasons. The first reason is that RO, NF or a combination of such hydrophilic membranes partially removes, for example, endotoxins from effluent streams. The levels of endotoxins in RO or NF product streams are much higher than the levels found in drinking water. Spreading endotoxins via the practices of "indirect potable uses" to drinking water resources and/or "direct non-potable uses" to the food chain (via irrigation) is a major health concern. EPS, as carriers for endotoxins, for instance, can pass on many effects on water quality, and thus they remain the focal point in ensuring public health. EPS also mask endotoxins from being properly assayed (e.g., only after a total hydrolysis of proteins, endotoxins may then be assayed) thereby masking endotoxins measurements. This may explain why endotoxins concentrations in laboratory reports are routinely ignored or overlooked.

The second reason is that the production of "near distilled water quality" (in terms of TDS; dissolved inorganics) from WWTRP is at the expense of generating copious amounts of reject streams (at least 15% of RO or NF feed stream) containing species mostly concentrated by about six-fold. Discharging RO or NF reject streams from WWTRP into receiving surface waters is thus far more riskier than discharging effluent streams from WWTP. Recycling of such reject streams directly to sewer networks or WWTRP influents is not possible since they contain high loads of OC and sulfate as well as transition metals that would impair the biological step. Recalcitrant organic and sulfate overloads would occupy a significant portion of dissolved oxygen; consequently inhibit both active biomass yield and nitrification within the biological step. Disposal in deep wells may also be restricted due to possible contamination of shallow groundwater aquifers via geological connectivity and leakage.

Whether using RO or NF product streams to replenish drinking water supply resources, or discharging RO or NF reject streams into water ways, dilution with receiving waters is the underpinning theme. However, dilution is not the remedy to pollution since dilution only expands pollution. Quality is the key, which should be the rule not the exception, for protecting human health and the environment.

It should be pointed out that in low-permeability shale and tight-sand exploration, potable water is typically and preferably used to fracture and stimulate the formation [Bader, application Ser. No. 14/545,681]. Each well may require between 1.7 and 4.2 million gallons (about 6,400-15,900 $m^3$) of potable water as a fracturing fluid. A portion of this fracturing fluid (e.g., may be 20-45%) flows back to the surface as produced water. For example, produced water from the Marcellus basin was over 1.3 billion gallons (4.9 million $m^3$) in 2014 alone. Such a staggering volume of produced water indicates at least substantial potable water dependency, if not overuse or depletion of potable water resources that may compete with other uses especially in water distressed areas. During fracturing; however, organics and ions that may include transition metals, scale-prone species, and Naturally Occurring Radioactive Materials (NORM) within formation layers are mobilized, mixed with high salinity downhole formation water, and brought to the surface with produced water. Here, effluent streams from WWTP and/or hydrophilic membranes' reject streams (MF, UF, NF, RO, or a combination) from WWTRP may be used, due to mainly their low salinity, instead of potable water, but only after a rigorous treatment, in hydro-fracturing. Such derivative streams from WWTP and/or WWTRP may also be mixed with other harmful waste streams such as produced water (to reduce the salinity of produced water), agricultural drainage water, mine drainage water, and the like. Such mixed streams, and only after a rigorous treatment, may then be used for fracturing to relief the overuse of potable water. These inventor's suggestions may provide plausible reuse paths for such harmful streams.

THE OBJECTIVES OF THIS INVENTION

The objectives of this invention are to provide Zero-Liquid-Discharge (ZLD) methods to directly reclaim effluent streams from WWTP and/or properly amend WWTRP. Thus, this invention can be implemented to completely eliminate the use of pressure-driven hydrophilic membranes (MF, UF, NF, RO, or a combination), as the WWTRP ongoing but very limited practice, by directly and independently treating effluent streams and/or reject streams (sludge thickener, sludge de-watering, and sludge incineration) from WWTP. This invention can also be implemented to amend WWTRP by either: (1) treating RO or NF feed streams in WWTRP as an effective pre-treatment to produce amenable products streams as well as amenable reject streams for direct reuse applications; or (2) treating reject streams resulting from MF, UF, NF, RO, sludge thickener, sludge de-watering, and sludge incineration in WWTRP as a post-treatment. Further, this invention can also be implemented for treating mixed streams (e.g., mixing effluent streams from WWTP and/or hydrophilic membranes' reject streams from WWTRP with other waste streams including produced water, agricultural drainage water, mine drainage water, and the like for reuse applications such as, but not limited to, hydro-fracturing of shale and sand formations.

SUMMARY OF THE INVENTION

In one aspect, the present invention provides a method for treating source water. The inventive method comprises separating endotoxins and carbon dioxide from source water by: (i) mixing either an aluminum source or an iron source with source water to separate endotoxins from acidic proteins and convert the naturally present bicarbonate in source water to carbon dioxide; and (ii) removing endotoxins and carbon dioxide from source water by hydrophobic membranes to produce de-toxified and de-carbonated source water. The aluminum source is selected from the group consisting of aluminum chloride, aluminum chlorohydrate, aluminum nitrate, aluminum sulfate, aluminum acetate, aluminum formate, and combinations thereof. The iron source is selected from the group consisting of iron chloride, iron chlorohydrate, iron nitrate, iron sulfate, iron acetate, iron formate, and combinations thereof. The method comprises separating endotoxins and carbon dioxide from source water, wherein step (ii) further comprises separating foulants and sulfate by: (i) mixing calcium hydroxide with the de-toxified and de-carbonated source water to form precipitates comprising either calcium sulfoaluminate or calcium sulfoferrate in a precipitator unit; and (ii) removing the precipitates by a filter. Foulants comprise magnesium, phosphates, extracellular polymeric substances (EPS), silica, boron, transition metals, and combinations thereof. The method comprises separating foulants and sulfate, wherein step (i) further comprises mixing an amine solvent, and recovering the amine solvent by a gas wherein the gas is selected from the group consisting of nitrogen, air, water vapor, and combinations thereof. The amine solvent is selected from the group consisting of isopropylamine, propylamine, dipropylamine, diisopropylamine, ethylamine, diethylamine, methylamine, dimethylamine, and combinations thereof.

In another alternative, the present invention provides a method for treating source water. The inventive method comprises separating endotoxins and carbon dioxide from source water by: (i) mixing calcium nitrate with source water to separate endotoxins from acidic proteins and convert the naturally present bicarbonate in source water to carbon dioxide; and (ii) removing endotoxins and carbon dioxide from source water by hydrophobic membranes to produce de-toxified and de-carbonated source water. The method comprises separating endotoxins and carbon dioxide from source water, wherein step (ii) further comprises separating foulants and sulfate by: (i) mixing either aluminum hydroxide or iron hydroxide with the de-toxified and de-carbonated source water to form precipitates comprising either calcium sulfoaluminate or calcium sulfoferrate in a precipitator unit; and (ii) removing the precipitates by a filter. Foulants comprise magnesium, phosphates, extracellular polymeric substances (EPS), silica, boron, transition metals, and combinations thereof. The method comprises separating foulants and sulfate, wherein step (i) further comprises mixing an amine solvent, and recovering the amine solvent by a gas wherein the gas is selected from the group consisting of nitrogen, air, water vapor, and combinations thereof. The amine solvent is selected from the group consisting of isopropylamine, propylamine, dipropylamine, diisopropylamine, ethylamine, diethylamine, methylamine, dimethylamine, and combinations thereof.

In yet another aspect, the present invention provides a method for treating source water. The inventive method comprises separating endotoxins and carbon dioxide from source water by: (i) mixing an amine solvent in an anionated form with source water to separate endotoxins from acidic proteins and convert the naturally present bicarbonate in source water to carbon dioxide; and (ii) removing endotoxins and carbon dioxide from source water by hydrophobic membranes to produce de-toxified and de-carbonated source water. The amine solvent is selected from the group consisting of isopropylamine, propylamine, dipropylamine, diisopropylamine, ethylamine, diethylamine, methylamine, dimethylamine, and combinations thereof. The anionated form is selected from the group consisting of chloride, chlorohydrate, nitrate, sulfate, phosphate, acetate, formate, and combinations thereof. The method comprises separating endotoxins and carbon dioxide from source water, wherein step (ii) further comprises separating foulants and sulfate by: (i) mixing calcium hydroxide, and either aluminum hydroxide or iron hydroxide with the de-toxified and de-carbonated source water to regenerate the amine solvent from it is anionated form and to form precipitates comprising either calcium sulfoaluminate or calcium sulfoferrate in a precipitator unit; and (ii) removing the precipitates by a filter. Foulants comprise magnesium, phosphates, extracellular polymeric substances (EPS), silica, boron, transition metals, and combinations thereof. The method comprises separating foulants and sulfate, wherein step (i) further comprises the step of recovering the regenerated amine solvent by a gas wherein the gas is selected from the group consisting of nitrogen, air, water vapor, and combinations thereof. The recovered amine solvent is reacted with an acid to produce the amine solvent in the anionated form for reuse. The acid is selected from the group consisting of hydrochloric acid, chloral hydrate, nitric acid, sulfuric acid, phosphoric acid, acetic acid, formic acid, and combinations thereof.

In yet another aspect, the present invention provides a method for treating source water. The inventive method comprises separating endotoxins and foulants from source water by: (i) mixing an amine solvent with source water in a first precipitator unit to form first precipitates comprising endotoxins and foulants; and (ii) removing the precipitates by a first filter to produce de-toxified and de-fouled source water. The method comprises separating endotoxins and foulants, wherein step (i) further comprises the step of recovering the amine solvent by a gas wherein the gas is selected from the group consisting of nitrogen, air, water vapor, and combinations thereof. The amine solvent is selected from the group consisting of isopropylamine, propylamine, dipropylamine, diisopropylamine, ethylamine, diethylamine, methylamine, dimethylamine, and combinations thereof. Foulants comprise magnesium, calcium, carbonate, phosphates, extracellular polymeric substances (EPS), silica, boron, transition metals, and combinations thereof. The method comprises separating endotoxins and foulants, wherein step (ii) further comprises separating sulfate by: (i) mixing the de-toxified and de-fouled source water with calcium hydroxide and either aluminum hydroxide or iron hydroxide in a second precipitator unit to form second precipitates comprising either calcium sulfoaluminate or calcium sulfoferrate; and (ii) removing the second precipitates by a second filter to produce de-sulfated source water.

Source water is selected from the group consisting of domestic wastewater, an effluent stream from a wastewater treatment plant, an effluent stream from a wastewater treatment and reclamation plant, a reverse osmosis reject stream from a wastewater treatment and reclamation plant, a nanofiltration reject stream from a wastewater treatment and reclamation plant, an ultrafiltration reject stream from a wastewater treatment and reclamation plant, a microfiltration reject stream from a wastewater treatment and reclamation plant, sludge thickening/dewatering reject streams from a wastewater treatment plant, sludge thickening/dewatering reject streams from a wastewater treatment and reclamation plant, produced water, agricultural drainage water, mine drainage water, and combinations thereof.

This invention is of particular interest in connection with applications such as, but not limited to, wastewater; wastewater treatment; wastewater treatment and reclamation; treatment of contaminated water resources such as surface water or groundwater by wastewater, derivative streams resulting from wastewater treatment plants (WWTP) and/or wastewater treatment and reclamation plants (WWTRP); oil and gas production; saline water desalination; mining; geothermal power plants; flue gas desulphurization; gypsum production; coal or oil fired power plants; boilers; cooling towers; agricultural drainage water; textile; treatment of contaminated water resources such as surface water or groundwater by natural brine or waste streams resulting from all kinds of mining operations; and treatment of natural brine, produced water, or waste streams resulting from all kinds of mining operations to prevent contaminating surface water or groundwater.

This invention is not restricted to use in connection with one particular application. This invention can be used, in general, for the effective and selective removal of critical inorganic and organic species from different source water. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

The Precipitation Concept

Figure 1:
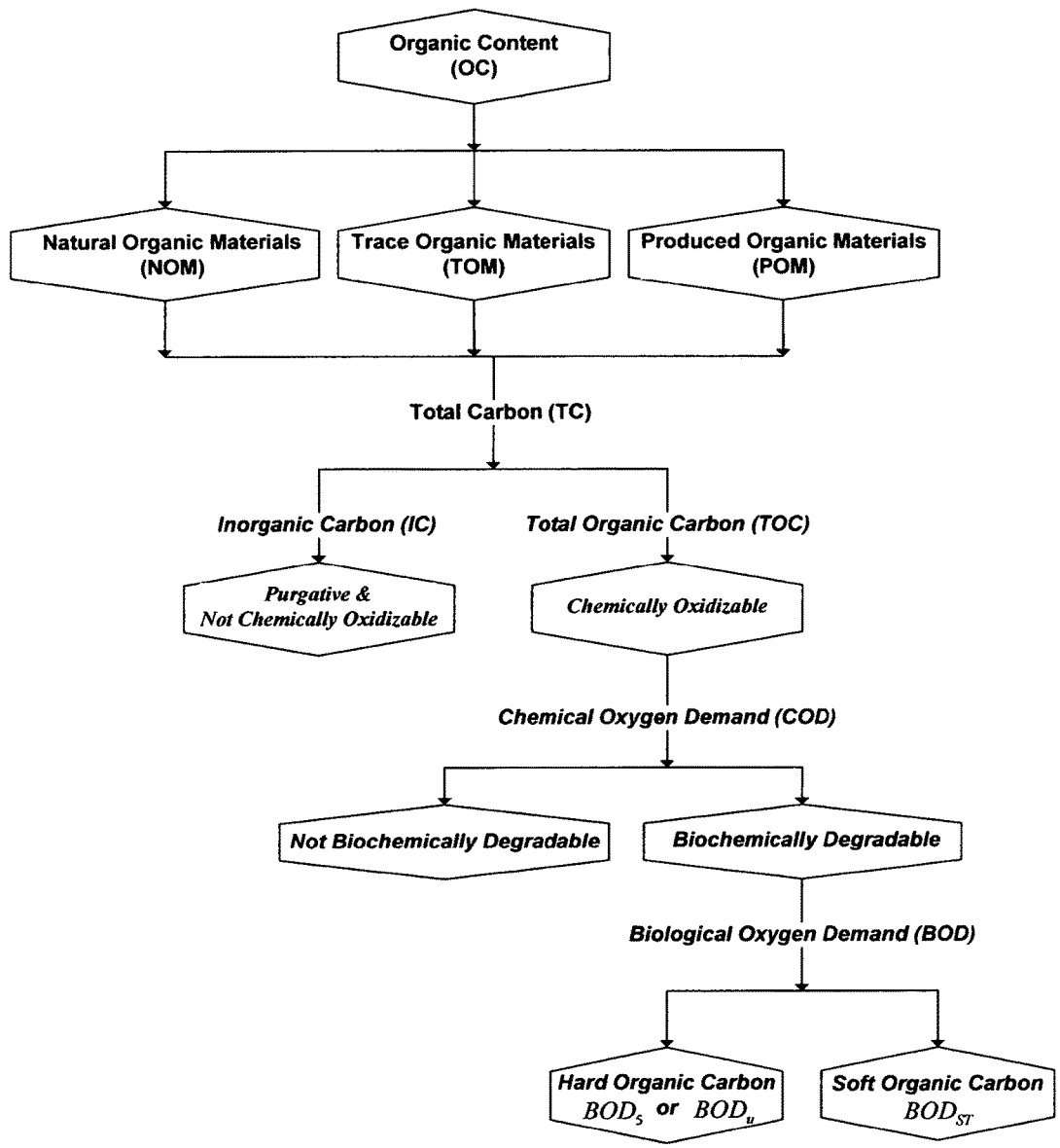
FIG. 1 illustrates the organic content (OC) in wastewater and it is conventional surrogate parameters.

I have previously invented the Liquid-Phase Precipitation (LPP) process for the separation of ionic species from aqueous streams. LPP is based on mixing an aqueous stream with a suitable solvent at ambient temperature and atmospheric pressure to form selective precipitates. The suitable solvents are those which have the capability to meet two basic criteria.

The first criteria is the suitability to precipitate targeted ionic species (charged inorganics and organics) from aqueous solutions. The selected organic solvent must be miscible with the aqueous phase. Of equal importance, the targeted ionic species must be sparingly soluble in the organic solvent. The addition of such a solvent to an ionic-aqueous solution leads to the capture of part of the water molecules and reduces the solubility of ionic species in the water which form insoluble precipitates. The solubility of the targeted ionic species in the organic solvent is a critical factor in achieving the degree of saturation. Therefore, solubility related factors such as ionic charge, ionic radius, and the presence of a suitable anion in the aqueous solution play an important role in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. Further, the selected solvent must be chemically stable, compatible, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different ionic species, favorable properties (boiling point: 32.4° C.; vapor pressure: 478 mmHg at 20° C.); and low environmental risks.

Nitrogen ($N_2$) can form compounds with only three covalent bonds to other atoms. An amine molecule contains $sp^3$-hybridized nitrogen atom bonded to one or more carbon atoms. The nitrogen has one orbital filled with a pair of unshared valence electrons, which allows these solvents to act as bases. As such, amines are weak bases that could undergo reversible reactions with water or acids. However, when an amine solvent reacts with an acid, the unshared electrons of the amine solvent are used to form sigma bond with the acid, which would transform the amine solvent into an anionated form. For example, the reaction of isopropylamine with formic acid produces isopropylamine formate, wherein isopropylamine is the amine solvent and formate is the anionated form. Amine solvents in anionated forms acts as weak acids. The anionated forms of the selected amine solvents that are found useful in this invention include chloride, chlorohydrate, nitrate, sulfate, phosphate, acetate, formate, and combinations thereof. The amine solvent can be regenerated from it is anionated form by treatment with a hydroxide source.

Improving the performance of LPP is always a target. One of the essential improvements is to minimize, if not eliminate, the use of the amine solvent. Inorganic additives can alternatively replace amine solvents or can be used in addition to amine solvents to induce precipitation of targeted species. The suitable inorganic additives for LPP are those that can form an insoluble inorganic-based compound of targeted charged species in an aqueous stream. Such inorganic additives should preferably be recoverable and recyclable, useable as a useful by-product, or produced locally from reject or waste streams. Also, such inorganic additives should not, themselves, constitute pollutants. Several inorganic additives were indentified, developed, and tested for LPP.

A second targeted improvement for LPP is to produce controllable precipitates that are uniformly distributed with high yield and preferably in submicron sizes. Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macrosize precipitates will form if given sufficient time to rest.

The state (stabile, metastabe, or unstable) of given precipitates can be expressed thermodynamically by the Gibbs free energy relation as follows:

$$\Delta G = \Delta H - T\Delta S \quad (1)$$

where $\Delta G$ is the free energy of precipitates (provided by, for instance, mechanical agitation or other means), $\Delta H$ is the enthalpy that represents the binding energy of the dispersed phase precipitates in water, T is the temperature, and $\Delta S$ is the entropy of the dispersed phase precipitates (the state of precipitates disorder). The binding energy ($\Delta H$) can be expressed in terms of the surface tension ($\tau$) and the increase in the surface area ($\Delta A$) as follows:

$$\Delta G = \tau \Delta A - T\Delta S \quad (2)$$

When the introduced free energy into the aqueous stream exceeds the binding energy of precipitates, individual precipitates are broken down and redistributed. In addition, when a surface active agent is present in the aqueous stream as an effective dispersant, r is reduced and thus the precipitates binding energy is diminished. Furthermore, part of the introduced energy may not contribute to precipitates' deflocculating but it dissipates in the aqueous stream in the form of heat which reduces viscosity. All of these factors increase precipitates dispersion or disorder (positive entropy). As such, the change in the entropy ($\Delta S$) quantitatively defines precipitates dispersion (solvation).

The Compressed-Phase Precipitation (CPP) process is thus developed by the inventor to achieve sub-micron precipitates in certain applications. CPP is conceptually similar to LPP in which the targeted ionic species must be nearly insoluble in the amine solvent whereas the mother solvent (water) is miscible with the amine solvent. However, the difference is that fluids in the CPP process can be subjected to pressure and/or temperature manipulations, or fluids modifications to force unusual thermo-physical properties (e.g., exhibit liquid-like density but with higher diffusivity, higher compressibility and lower viscosity).

The fast diffusion combined with low viscosity of a compressed amine solvent into an aqueous phase produces faster supersaturation of targeted ionic species, and their possible precipitation in the desired and sub-micron and micron sizes. Thus, the precipitate's size, size distribution, morphology, and structure can be controlled. Achieving faster supersaturation would, in turn, minimize the use of the amine solvent, reduce the size of precipitation vessels (a very short retention time), and allow the recovery of targeted ionic species in the desired precipitates shape and distribution.

Several factors could influence the performance of the precipitation process. Among such factors are: (1) the chemistry of the aqueous stream along with the identity and concentration of it is targeted species; and (2) the conditions under which precipitation is induced by mixing the additive (an inorganic, an amine solvent, or both) with the aqueous stream.

Testing of Source Water

Effluent Streams Vs. Hydrophilic Membranes Reject Streams

Figure 2:
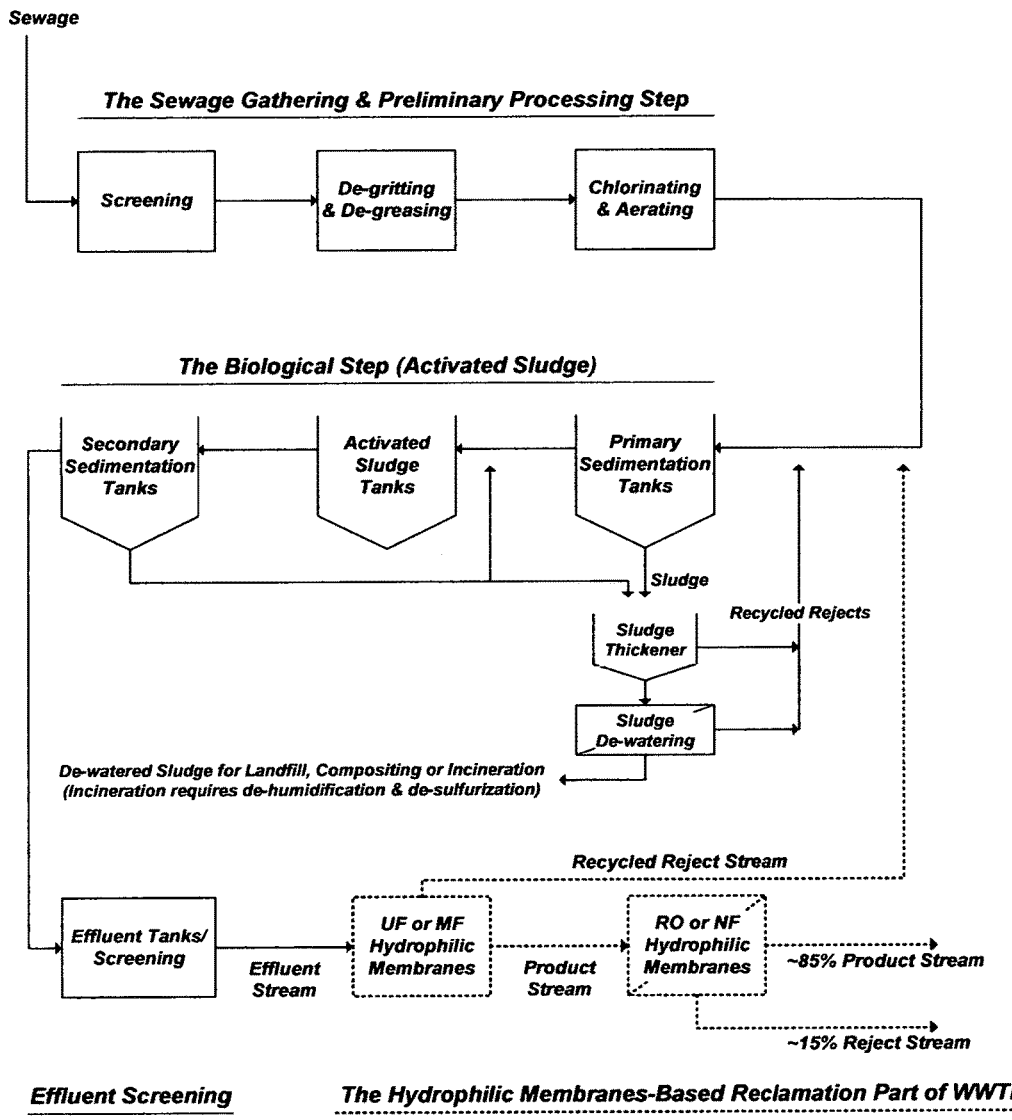
FIG. 2 illustrates a hypothetical flow diagram for a WWTRP.

As shown in FIG. 2, the effluent stream from the biological step is the feed stream to the hydrophilic membranes (e.g., UF-RO), where the UF-RO membranes constitute the reclamation part of WWTRP. Table 1, as an example, presents the reported species concentrations in the effluent stream and the RO reject stream. Table 1 indicates that inorganic species are extensively analyzed whereas organic species are largely ignored.

The vast majority of inorganic species are nearly highly rejected (~98%) by RO. Therefore, the differences in the concentrations of such highly rejected inorganic species between the RO reject stream and the effluent stream seem consistent with the RO rejection rate at 85% recovery ratio (RR). RR is defined as the ratio of the product flow rate to the feed flow rate. As a result, the total inorganic content (in terms of TDS) in the RO reject stream is higher than that in the effluent stream by over six-fold. The ratio of inorganic scale-prone species (bicarbonate, sulfate, phosphate, magnesium, calcium, strontium, barium, transition metals and silica) to the total inorganic content in the effluent stream is about 37% (in terms of meq./L), which remains about the same in the RO reject stream. In terms of strictly the total inorganic content, the effluent stream may seem naturally amenable for most reuse applications whereas the RO reject stream may require further treatment (depleting of at least the inorganic scale prone species or nearly depleting the entire TDS) for most reuse applications.

At least four sparingly soluble inorganic compounds under certain conditions are prone to form scale deposits. These compounds comprise magnesium hydroxide, calcium carbonates, calcium sulfates, and calcium phosphates. Some forms of the last three compounds exhibit inverse solubility limits with temperature at a certain temperatures range. Calcium phosphates and calcium sulfates scales, in particular, are very difficult to mitigate by scale inhibitors. Within the membranes reclamation part of the WWTRP, calcium phosphates and calcium sulfates are prone to build-up at the membranes surfaces. Their builds-up may cause severe pores blockages, hinder steady RR, and force frequent membranes cleanup and/or shutdowns. Scale inhibitors are primitive in nature with proven limited values in solving sulfates and phosphates scale.

Phosphorus species are an essential nutrient to all living cells. Total phosphorus (TP) in domestic wastewater comprises inorganic and organic forms. Orthophosphates (e.g., $PO_4^{-3}$, $HPO_4^{-2}$, $H_2PO_4^{-}$ and $H_3PO_4$) are the inorganic form. Organic phosphates comprise a chain of polyphosphates (e.g., $P_2O_7^{-3}$, $P_3O_{10}^{-5}$, etc.) linked to an organic carrier (e.g., nucleotides). Polyphosphates are high energy molecules and their chain is connected by a reaction coupling with the organic carrier. The main organic carrier is adenosine, which is adenine (a base) and ribose (a monosaccharide) held together by a N-glycoside bond. The chain of polyphosphates is linked to ribose by one polyphosphate ester bond and two high-energy anhydride polyphosphate bonds, which forms adenosine tri-phosphates (ATP). As the primary energy regulator of all organisms, ATP may control the operation of the biological step by unhooking the last polyphosphate bond (adenosine di-phosphates, ADP) or the last two polyphosphate bonds (adenosine mono-phosphates, AMP) on ATP, and hooking back such a polyphosphate bond(s) to reform ATP.

The typical concentration of TP in influent wastewater may be 15-20 mg/L. As an essential nutrient to organisms, the concentration of TP in wastewater is more than necessary for the biological step that may only utilize about 20-30% of TP. Controlling TP is thus critical not only to achieve an efficient operation of the biological step but also to minimize the impact of discharging effluent streams and/or RO reject streams on receiving waters.

Photosynthetic autotrophs (e.g., plants, algae and cyanobacteria) in receiving waters require sunlight, a carbon source (e.g., carbon dioxide and bicarbonate that are naturally present in receiving waters), and the same TP nutrient as the biological step (synthetic heterotrophs) in WWTP or WWTRP. As such, eutrophication is essentially driven by the amounts of TP and EPS in a discharged effluent stream or RO reject stream. The biological step partially removes TP and thus a significant amount of TP remains in the effluent stream (Table 1), yet RO at 85% RR re-concentrates TP in it is reject stream by about six-fold (Table 1), whereas algae and cyanobacteria in receiving waters flourish at a concentration as low as may be 0.1 mg/L of TP. Thus, evidence of devastating effects where receiving waters have been subjected to effluent and/or RO reject discharges is blatant.

POM (insoluble and soluble EPS) are microbially produced in the biological step. A portion of POM settles out as sludge but some remain suspended and dissolved in the effluent stream. As such, rigorous analysis of the carried over OC with the effluent stream as well as the settled sludge is of prime importance for at least two fundamental factors.

The first factor is the bio-polymeric nature and massive production of EPS in the biological step. EPS may roughly constitute about 80% of the total biomass. The second factor is that bacteria grow in suspension since suspension, unlike sludge, does not hinder nutrients diffusion. A proper sludge settling for the biological step occurs when bacteria are diminished or washed-out. These fundamental factors are critical to understand the fate and implication of EPS on the specific design and overall performance of WWTP or WWTRP.

As given in Table 1, COD may be the only routinely measured parameter that is blindly used to assess the overall OC load. COD may reflect, to some degree, the overall OC load, particularly EPS, since they are the main controller of oxygen demand. The difference in COD values between the effluent stream and the RO reject stream may primitively indicate the collective abilities of the hydrophilic membranes (UF and RO) of rejecting OC. A low overall OC rejection by such hydrophilic membranes can be inferred from the COD values. This low OC rejection precludes the production of acceptable quality reclaimed water (e.g., the RO product stream), re-concentrates OC in the RO reject stream, and thus reinforces the unsuitability of such hydrophilic membranes to reclaim effluent streams since they are simply feed stream splitters. This means species in the feed stream are reduced in the product stream but concentrated in the reject stream, the reduction/concentration factor between the product stream and the reject stream is governed by the membrane's rejection rate for each species and the permissible membrane's RR, and at least the reject stream requires a proper disposal path or a further treatment to render it harmless.

The non-volatile TOC in RO reject stream is, on average, 56 mg/L. EPS, as microbially produced materials, are net negatively charged organic acids. As noted earlier [0007], EPS may be poorly included in such TOC measurements. However, EPS are the dominant matrices that bind inorganic scale prone species, carry endotoxins, and promote bio-growth, bio-fouling, bio-foaming and corrosion.

Effluent streams from WWTP and hydrophilic membranes' reject streams from WWTRP should not pose health and pollution threats. This implies that in considering any possible treatment for such derivative streams of domestic wastewater, one should be prepared: (1) to design the treatment method based not only on removing EPS (insoluble and soluble) and their precursors that further form other harmful by-products but also on providing a stabilizing sink to contain them; (2) to utilize more advanced analytical tools to intrinsically characterize EPS properties and innovatively use such properties to contain them; and (3) not to rely on a blind lump sum parameter (e.g., TOC) that might erroneously be assumed to provide collective information but "what is" and "what is not" included in such a parameter may not be obvious.

Figure 3:
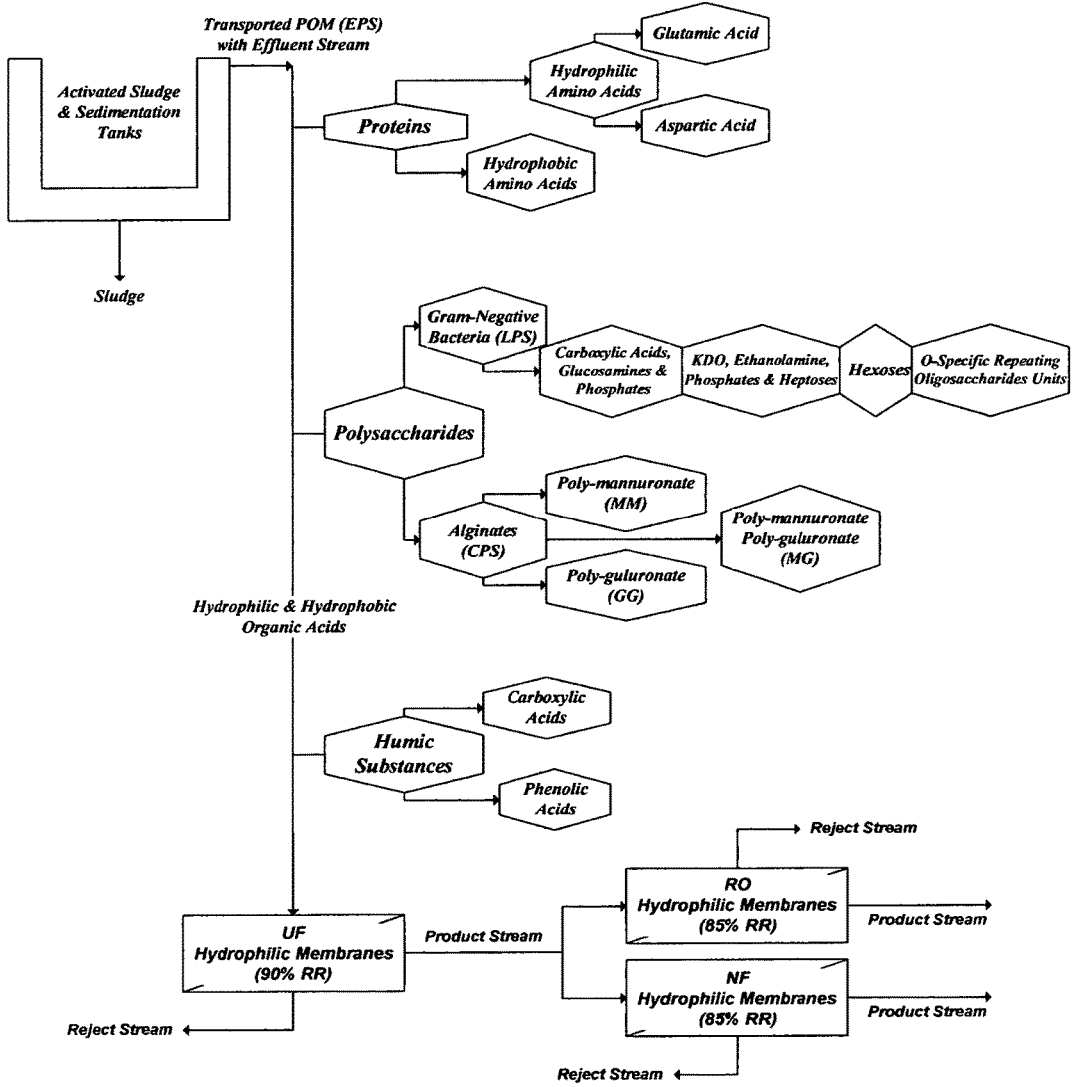
FIG. 3 illustrates the fractionation and characterization of OC in effluent streams.

Fractionation of EPS using more advanced analytical techniques is the key for useful characterization, which may pave the path for properly reclaiming effluent streams. In one of the inventor's studies, the fractionation of OC using advanced methods (e.g., size-exclusion chromatography, ion-exclusion chromatography, anion-exchange chromatography, hydrophobic-interaction chromatography, gel-filtration chromatography, etc.) along with appropriate analytical techniques is conducted to evaluate the actual roles of OC. As such, FIG. 3 depicts the fractionation of carried over EPS with activated sludge effluent streams.

EPS are made up of proteins, polysaccharides, lipids, nucleic acids, and humic substances. Transported EPS with an activated sludge effluent stream thus represent complex matrices of multiple species that have individual characteristics (e.g., size, charge, acid-base interactions, hydrophobicity, hydrophilicity, etc.). However, they possess a net negative surface charge at typical pH conditions found in activated sludge.

Proteins are one of the most important fractions of EPS. Proteins play several key roles in the formation and aggregation of EPS. The first role is the direct binding of their copious negatively charged hydrophilic amino acids (e.g., glutamic and aspartic acids) and divalent cations to stabilize EPS aggregate structures. The second role is the contribution of hydrophobic amino acids by clustering with other hydrophobic species. The third role is that extracellular proteins: (1) trap, bind and concentrate organics within the microenvironment of the embedded cells; and (2) slowly degrade polysaccharides that release of bio-films.

EPS also contain humic substances in their structure. Humic substances are hydrophobic species comprising carboxylic and phenolic acids.

Microbial polysaccharides also constitute a very important fraction of EPS. Lipopolysaccharides (LPS), known as endotoxins, are mostly found in the outer membrane of Gram-negative bacteria. They are the integral part of the outer cell membrane and are responsible for the functionality and stability of the bacteria. The general structure of all endotoxins has three distinct parts (a lipid A, a center core with an inner part and an outer part, and an O-antigen). Lipid A comprises a disaccharide of glucosamine, which is partially phosphorylated and highly substituted with amide-linked and ester-linked long-chain carboxylic acids. The most common amide-linked carboxylic acid is a 14 carbon chain, 3-acyloxyacyl residue. The ester-linked carboxylic acids tend to be more variable having saturated hydrocarbon chains with 12 to 18 carbons. Lipid A is linked to the inner part of a central core. The inner part of the central core is also partially phosphorylated and contains 2-keto-3-deoxyoctonic acid (KDO) and heptose residues. The phosphate groups at lipid A and the inner part of the central core may be altered with ethanolamine, pectinose, and divalent cations in varying amounts. The outer part of the central core, which comprises hexose residues, is in turn linked to hydrophilic, water soluble, side chains (O-specific polysaccharide chains; each chain comprises three to eight monosaccharide units). Single monosaccharide units may also be altered by glycosylation, acetylation, or sialyation. All endotoxic activities reside within lipid A and it is attached inner part of the central core. As such, active structural substitutions and alternations enable endotoxins to adopt to changing conditions without impairing their viability and lethality.

The molecular structures of LPS are thus heterogeneous in terms of size, interaction, composition, substitution and alternation. Their peculiar flexible and diverse structures, and their broad spectrum of endotoxic activities have made them the most harmful constituents in domestic wastewater and derivative streams resulting from treated and reclaimed domestic wastewater. They have a hydrophilic (water soluble) head group (O-polysaccharide chains) at the outer structure and a tail group (lipid A and the inner part of the core). The tail group comprises neighboring carboxylic chains and phosphate chains. At low pH, such chains are less ionized but the carboxylic chains are hydrophobic whereas the phosphate chains (e.g., $H_3PO_4$) may be hydrophilic, and therefore the tail group may be amphiphilic. By neutralizing the phosphate chains at low pH, the naturally present divalent cations in wastewater have less available interaction sites, and thus act as mediators between only the negatively charged carboxylic chains and proteins. As a result, the hydrophobic species in the tail group are driven toward a compact structure. However, under about the typical neutral pH conditions (e.g., 6.5 to 7.4) in wastewater, carboxylic and phosphate chains are more ionized and the phosphate chains (e.g., $HPO_4^{-2}$ and $H_2PO_4^-$) tend to be hydrophobic due to binding with the naturally present divalent cations in wastewater, and thus the tail group may be entirely hydrophobic. Here, divalent cations have more available interaction sites to bind both the negatively charged phosphate and carboxylic chains with proteins.

The unique nature of LPS controls their binding, aggregation (micelles and vesicles) and disaggregation (monomers) in proteins-rich wastewater, which may be illustrated as follows:

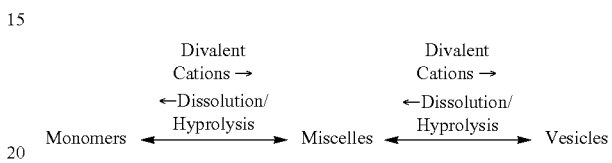

Upon folding in wastewater under the typical pH conditions (e.g., 6.5 to 7.4), the hydrophobic tail group forms a shielded core within proteins by clustering the hydrophobic side chains of proteins with carboxylic chains of lipid A and binding divalent cations (magnesium and calcium) that naturally present in wastewater with the phosphate bearing hydroxyl groups of lipid A and it is attached inner core. The overwhelmingly hydrophilic outer structures of both proteins (hydrophilic amino acids) and LPS (O-polysaccharide blocks) allow such outer structures to amicably bond with the hydrogen molecules (water soluble) in wastewater while endotoxins are shielded as a caged core from interactions with the surrounding aqueous phase. Although endotoxins are shielded; however, they may be continuously and slowly liberated in the form of monomers (disaggregates) into the surrounding aqueous phase by: (1) dissolution when proteins comprise a higher fraction of EPS due to lyase enzymes of proteins (e.g., in sludge); and (2) hydrolysis when polysaccharides comprise a higher fraction of EPS (e.g., in effluent streams); though it may be less pronounced if EPS comprise of more proteins but less polysaccharides (e.g., in sludge).

In order to preliminary evaluate the removal of EPS from an activated sludge effluent stream, the inventor has initially tested two parallel sets of hydrophilic membranes-based reclamation systems (UF-NF and UF-RO). The activated sludge effluent stream is treated by UF at 90% RR. The nominal molecular weight cut off (MWCO) of the UF hydrophilic membrane is 50 k Daltons (Da); ~0.02 μm nominal pore size. The UF product stream is then treated by two parallel sets of NF and RO hydrophilic membranes, and each of the NF and RO set is conducted at 85% RR. The nominal MWCO of the NF membrane is 0.2 kDa; ~0.001 μm nominal pore size. The membranes testing setups (UF-NF and UF-RO) are also depicted in FIG. 3. The main findings of the inventor's study are summarized as follows.

The hydrophilic portion of OC is fractionated by a size-exclusion chromatography into four groups based on their molecular weights: (1) polymeric species that include proteins and building blocks of polysaccharides with molecular weights greater than 20 kDa; (2) humic substances with molecular weights between 0.5 and 1 kDa; (3) breakdown products (proteins, building blocks of polysaccharides, and humic substances) with molecular weights between 0.3 and 0.5 kDa; and (4) lower molecular weight species (<0.3 kDa) including individual monomeric LPS molecules and disinfection by-products (DBP). On the other hand, the hydrophobic portion of OC is accounted for by a hydrophobic-interaction chromatography.

The average rejection of polymeric species by UF is about 81%. However, the average rejection of endotoxins by UF is about 50%. LPS in the effluent stream may be complex molecules (micelles or vesicles) and/or bi-layer monomers with a wide range of molecular weights that may approximately extend between 0.3 and 150 kDa. Such a range of molecular weights extends from well below to well above the MWCO of UF, which would explain, in part, the low rejection of endotoxins by UF.

The hydrophobic fraction is about 8% of the total OC. The average UF rejection for the hydrophobic fraction is about 56%.

The rest of the hydrophilic groups are nearly completely transported with the UF product stream since their molecular weights are well below the MWCO of the UF membrane, and thus UF is incapable of rejecting such groups. The NF and RO rejection for the rest of such hydrophilic groups vary based on the molecular weights of each group; decrease with the decrease in their molecular weights. The difference between the rejection abilities of NF and RO is nearly insignificant, and the variations in their rejection are within the uncertainties of analytical instruments. The NF and RO rejection of humic substances, breakdown products, and lower molecular weights species are about, respectively, 80-85%, 49-56%, 40-47%. On the other hand, the rejection of the hydrophobic fraction by NF and RO is near complete (>99%).

It is interesting to note that the rejection of endotoxins by the NF and RO hydrophilic membranes is about 81-83%. This falls within the rejection range of species with molecular weights above 0.5 kDa. Since proteins-endotoxins interactions in wastewater shield endotoxins from the surrounding aqueous phase, the separation of endotoxins is therefore largely coupled with the separation of proteins. However, the removal of endotoxins by NF and RO membranes is far from complete even though the majority of their proteins carrier may fall within or above the nominal pore sizes of NF and RO membranes, especially the RO membrane. The fragmentation of endotoxins, which may be due to their active shedding, their slow but continuous release from proteins into the aqueous phase, the turbulent flow at the membranes surfaces, fragments (bio-films) built-up at the membranes surfaces and fragments aging within the membranes pores, precludes sufficient removal of endotoxins by "size-exclusion". As such, fragments of endotoxins can easily pass through the NF and RO hydrophilic membranes and transport within the NF or RO product stream.

The standard unit for reporting endotoxins is the Endotoxin Unit (EU), which is equivalent to 0.1 ng. The typical range of endotoxins in drinking water is 1-50 EU/ml. However, the concentrations of endotoxins in the tested NF and RO: (1) product streams are 130-210 EU/mL (13,000-21,000 ng/L); and (2) reject streams are 4,250-6,500 EU/mL (425,000-650,000 ng/L). It is worth noting that a pyrogenic reaction may be caused by only a small concentration of endotoxins (as low as 0.1 ng/kg of body weight).

Figure 4:
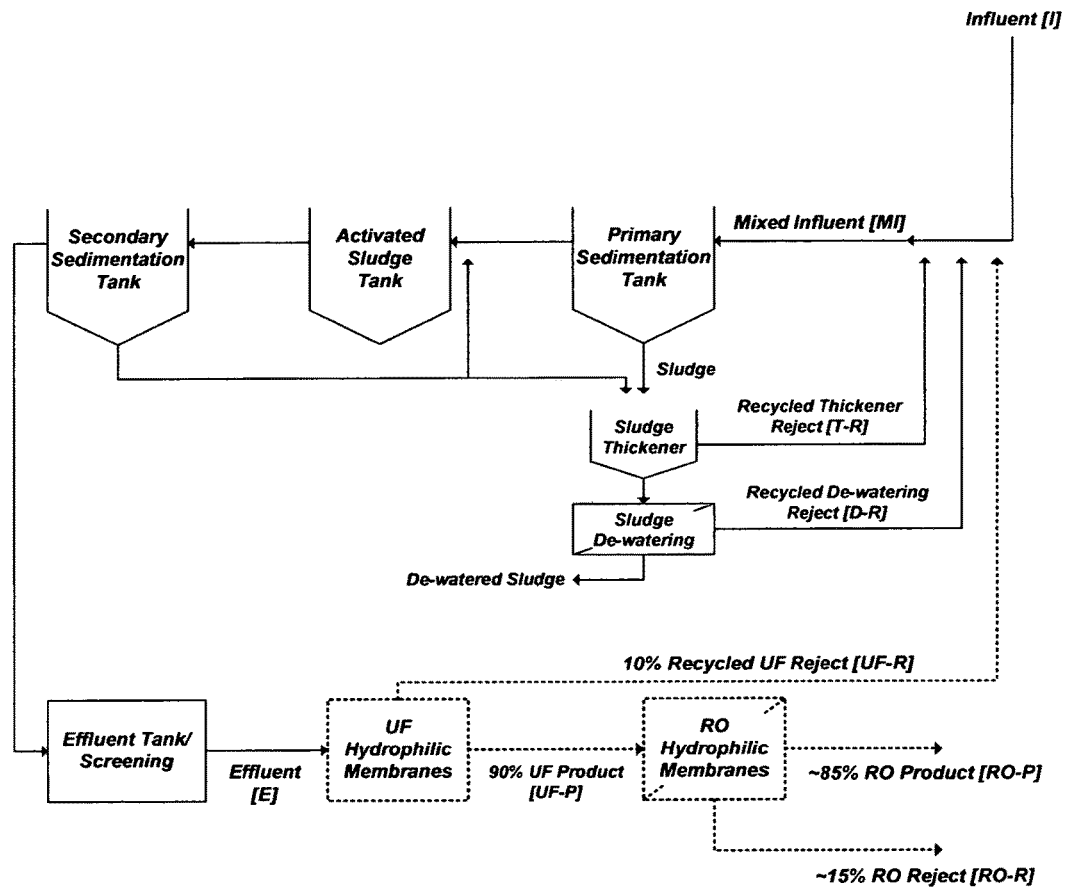
FIG. 4 illustrates the flow diagram of the tested pilot plant by the inventor.

The above discussed testings by the inventor are aimed at the fractionation of OC in the activated sludge effluent stream as well the basic performance of the reclamation hydrophilic membranes (UF-RO and UF-NF) for removing OC from the effluent stream. However, further considerations are given by the inventor to the effect of recycled reject streams (UF reject and/or sludge thickener and de-watering rejects), which is the ongoing practice in WWTRP,
on the performance of the biological step that to some extent controls the levels of endotoxins in the effluent stream. As such, a pilot plant testing is conducted by the inventor as shown in FIG. 4 to reflect the actual performance of WWTRP and WWTP with such typically recycled rejects to the influent stream. The WWTRP includes the hydrophilic membranes-based reclamation part (UF-RO) whereas the WWTP does not. The gathered pilot plant data are then employed by the inventor to scale up WWTRP and WWTP to treat 375,000 m$^3$/day of influent. Based on the pilot data, Table 2 shows the projected levels of endotoxins in WWTRP and WWTP, which reflects the ongoing practice with such recycled reject streams.

As depicted in FIG. 4 and presented in Table 2, the typically recycled reject streams in the WWTRP increase the influent daily load of endotoxins (EU/day) by 112% (93% by the UF reject, 16% by the sludge thickener reject, and 2.5% by the sludge de-watering reject). The recycled UF reject is by far the highest contributor that elevates the load of endotoxins not only in the mixed influent but also indirectly in the rejects from the sludge thickener (e.g., an aerobic digester) and sludge de-watering. Thus, the daily load of endotoxins in the mixed influent is over two-fold the daily load of endotoxins in the influent. As a result, the daily load of endotoxins in the effluent is higher than that in the influent by 70%. The daily load of endotoxins in the RO product is 10% of that in the influent, but the level of endotoxins is eight-fold higher than the presumed maximum level of endoxtins in drinking water (e.g., 50 EU/ml). On the other hand, the daily load of endotoxins in the RO reject (15% of RO feed) is about two-thirds (66.4%) of that in the influent. As such, discharging 56,250 m$^3$ per day (14.9 million gallons per day) of the RO reject in term of endotoxins is equivalent to directly discharging 248,800 m$^3$ per day (65.7 million gallons per day) of sewage influent into receiving waters.

As also presented in Table 2 (FIG. 4), the typically recycled reject streams in the WWTP increase the influent daily load of endotoxins by about 9% (8% by the sludge thickener reject, and 1% by the sludge de-watering reject). As such, the daily load of endotoxins in the mixed influent is higher by about 9% than that in the influent. However, the daily load of endotoxins in the effluent is lower than that in the influent by about 24%.

It is interesting to note that the daily load of endotoxins in the effluent of WWTP as the final product is practically equivalent to that in the final products of WWTRP (the combined RO product and reject streams) even though the daily flow of the WWTP effluent is slightly higher (by 1000 m$^3$ per day or 264,200 gallons per day) than the daily flow of the RO feed (the UF product). Hydrophilic membranes are very valuable systems when deployed properly, but here, there is clearly no advantage for adding such elaborate and expensive hydrophilic membranes (e.g., UF-RO) as a reclamation part to further treat the effluent stream in terms of endotoxins. This is the same fundamental observation that was made by the inventor in 1987 (about 30 years ago) when the integration of such hydrophilic membranes with WWTP was an idea at the infant stage. Nowadays, a few WWTRP are implemented but not accepted since, as revealed above, such hydrophilic membranes do nothing more than re-distribute endotoxins between their product streams and reject streams. Thus, they are not ZLD systems, and require further treatment not only for their reject streams but in fact for their both product and reject streams.

Table 3 shows the distribution levels of endotoxins when the biological step is independently operated from the integrated UF-RO hydrophilic membranes reclamation part of WWTRP. This means that only the thickener and de-watering rejects are recycled to the influent (as is the case with most WWTP) but the UF reject stream is not recycled to the influent (as is not case with ongoing practice of WWTRP). The daily load of endotoxins in the RO product is about 6% of that in the influent but with a significant lower daily flow (about 23% less than the influent daily flow), and still the level of endotoxins is higher by five-fold than the presumed maximum level of endoxtins in drinking water. On the other hand, the daily flow and the daily load of endotoxins in the combined rejects (UF and RO reject streams) are about, respectively, 24% and 71% of the influent. Both UF and RO reject streams are heavily infested with endotoxins but the UF reject is the largest contributor even though it is daily flow is about 43% of the daily flow of the combined reject streams. Thus, discharging 88,400 m$^3$ per day (23.4 million gallons per day) of such combined rejects in term of endotoxins is equivalent to the discharge of 266,250 m$^3$ per day (70.3 million gallons per day) of sewage influent into receiving waters.

When the WWTRP is operated without recycling any reject to the influent, as also presented in Table 3, the daily load of endotoxins in the effluent without recycling any reject is lower than that in the influent by about 33%. The daily load of endotoxins in the RO product is about 4% of that in the influent but with a significant lower daily flow (about 27% less than the influent daily flow), and still the level of endotoxins is higher by four-fold than the presumed maximum level of endoxtins in drinking water. On the other hand, the daily flow and load of endotoxins in the combined rejects (RO reject, UF reject, thickener reject, and de-watering reject) are about, respectively, 25% and 70% of the daily flow and load of endotoxins in the influent. The main contributors for endotoxins in the combined rejects are the UF and RO rejects, and the thickener and de-watering rejects slightly reduce the daily load of endotoxins in the combined rejects. As such, discharging 94,300 m$^3$ per day (24.9 million gallons per day) of the combined rejects in term of endotoxins is equivalent to the discharge of 262,500 m$^3$ per day (69.4 million gallons per day) of sewage influent into receiving surface waters.

While the limitation of water resources is one of the main motivations for treating and reclaiming domestic wastewater, the harmful effects of endotoxins load on water reuse as well as water discharge into receiving waters are exceptionally and totally ignored, when the removal of endotoxins must be the rule not the exception. The harmful effect of the remaining TP load, which causes eutrophication in receiving waters, is also largely ignored. However, the removal of excess TP is presumably attempted by alternating exposure of phosphates accumulating bacteria within the biological step to anaerobic (primary sedimentation tanks) and aerobic zones (activated sludge and secondary sedimentation tanks). It is based on the reaction coupling of ATP by operating in the ATP hydrolysis direction, using ATP generated by fermentative bacteria to provide a proton gradient (energy) to drive nutrient accumulation and maintain ionic balance. When bacterial cells require energy, one of the high-energy polyphosphates bonds is broken down, and thus ATP is transferred to ADP. When bacterial cells build-up so much energy, then ADP is reconverted to ATP. This reversible reaction coupling may be simplified as follows:

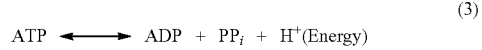

(3)

where PP$_i$ is polyphosphates and H$^+$ is the excess positive charge (the proton gradient).

Since ATP is an energy-coupling agent, energy cannot be stored but rather is produced by one set of reaction and is almost immediately utilized by the reversed reaction set. In the anaerobic zone, soluble OC is fermented by fermentative bacteria to produce a variety of volatile carboxylic acids. Phosphates accumulating bacteria immediately absorb and polymerize the fermentative carboxylic acids (e.g., hydroxy-alkanoates) but cannot degrade them under the anaerobic condition. The polymerization of the carboxylic acids requires more energy, which is supplied by breaking down one of the high-energy polyphosphate bonds of ATP, releasing ADP, a chain of pyrophosphates and energy. The released bond of pyrophosphates is then broken down by an inorganic enzyme (polyphosphatase) to form orthophosphates. The anaerobic zone is thus supplied with two sources of orthophosphates, one is naturally present in the influent and the second one is concurrently produced by unhooking a bond of polyphosphates from ATP and breaking them down to orthophosphates. In the aerobic zone, bacteria utilize oxygen to degrade the fermentative carboxylic acids as a carbon source and thus energy is released. The released energy is consumed by absorbing some of the available orthophosphates (naturally present in the influent and produced in the anaerobic zone) to regenerate the broken bond of pyrophosphates to be hooked to ADP, and thus ATP is re-formed. A portion of the elevated concentration of TP is removed with the discharge sludge from the second sedimentation tanks (the final step of the aerobic zone) where the sludge is further subjected to thickening and dewatering. Reject streams from the sludge thickener and de-watering, which are decanted streams, are recycled to the first sedimentation tanks (the anaerobic zone) to repeat the process of exposing bacteria to alternating anaerobic and aerobic conditions. However, this process particularly in WWTRP, as confirmed by the inventor's pilot testing, is operationally unstable and only removed, on average, about 40-48% of TP from the mixed influent.

The relatively low and unstable removal of TP may be attributed to the recycling of the reject streams to the influent, particularly the UF reject stream since is heavily infested with endotoxins. In Gram-negative bacteria, polysaccharides are built by the linkage of two or more monosaccharides (sugars) by O-glycosidic bonds since sugars contain many hydroxide groups. Polysaccharides play vital roles not only in maintaining the structural integrity of Gram-negative bacteria but also in energy storage. As such, the excessive levels of Gram-negative bacteria (endotoxins) in the recycled UF reject stream to the anaerobic zone when subjected to a sudden and strenuous activity, the glycolysis of glycogen (release of glucose) can provide energy in the absence of oxygen and can thus supply energy for anaerobic activity without using polyphosphates (not to break one of the ATP high-energy polyphosphates bonds). This may explain the partial release of orthophosphates in the anaerobic zone.

The alarming levels of endotoxins in all outputs resulting from the treatment of domestic wastewater, if not managed responsibly, would pose serious health and pollution risks. An example of such risks is the use of hydrophilic membranes (e.g., RO or NF) product streams to augment groundwater aquifers and potable water reservoirs, which are direct paths for endotoxins to drinking water supplies. Another example of such risks is the use of effluent streams and/or hydrophilic membranes (e.g., RO or NF) product streams as irrigation water (as well as sludge as a fertilizer) for applications such as agriculture and animal feed crops, which is an indirect path for endotoxins to the food chain. Airborne endotoxins also cause respiratory problems, fever and fatigue. Inhalation of moisture-laden air containing endotoxins via aerosolisation of effluent streams and/or hydrophilic membranes product streams (e.g., recreational irrigation, cooling towers, humidifiers, fire fighting, car washing facilities, etc.) and via venting from dehumidifiers (e.g., the membranes-reclamation part of WWTRP is typically housed in a closed shelter that requires dehumidification) are direct paths for airborne endotoxins. Yet, a further example of such risks is the discharge of effluent streams and/or hydrophilic membranes rejects streams into receiving waters, which is also an indirect path for endotoxins to source water. If, for instance, seawater is used as source water for producing drinking water in some coastal areas, thermal-driven seawater de-salting methods at their top temperature (<110° C.), would neither destruct nor separate endotoxic fragments, and thus endotoxins are carried over with their produced drinking water. Similarly, hydrophilic membranes such as RO are also ineffective in separating endotoxic fragments from nearly proteins-free seawater by "size exclusion".

Endotoxins act against cells or organs via activation of the immune system (e.g., the macrophages, lymphocytes, and monocytes). Their potent endotoxic activities are released through mediators (e.g., interleukins, prostaglandins, colony stimulators, tumor necrosis, platelet activators and free radicals). Endotoxins have strong effects at very low levels in humans and animals when entering the blood stream by affecting the structure and function of cells and organs, changing metabolic functions, triggering hemostasis via platelet adhesion and coagulation, altering hemodynamics, raising body temperature, and causing shock. Yet, endotoxins are notoriously resistant to destruction by heat (stable at 120° C.), desiccation, pH extremes and various disinfection methods. Some of these methods may only kill live bacteria but none alters endotoxic activities of pyrogens, and thus dead bacteria would remain a source for pyrogens if not physically separated. Disinfection may be the only practical option in wastewater treatment, and chlorination may be the most practiced disinfection method. As confirmed by the inventor's testing; however, chlorination does not reduce endotoxic activities in neither effluent streams nor RO reject streams, and increasing neither the chlorination dose nor the chlorination contact time can reduce endotoxic activities. Because of their high toxicity and adverse effects, endotoxins remain a high health risk in treated or reclaimed domestic wastewater. Their removal is thus essential for both safe reuse and discharge of derivative streams resulting from treating (e.g., effluent streams) and reclaiming (e.g., both RO product and reject streams) domestic wastewater. However, an effective general method for the removal of endotoxins from proteins-rich wastewater (or may be any other proteins-rich solutions) is not available.

The proteins-endotoxins interactions largely shield endotoxins from the surrounding aqueous phase but also slowly release endotoxins into the aqueous phase. Such interactions either (1) force the separation of endotoxins via coupling with proteins as a carrier for endotoxins, which is attempted by hydrophilic membranes (MF, UF, NF and RO), but as demonstrated above such membranes, individually or in a combination, are not only incapable of sufficiently removing endotoxins to an acceptable level in their product streams but also dangerously concentrate endotoxins in their reject streams; or (2) render the separation of endotoxins from proteins as a complex and difficult task especially in large scale applications. It must thus be emphasized that there is a distinct difference between separating endotoxins from a proteins-rich aqueous phase (e.g., domestic wastewater) and separating endotoxins from a nearly proteins-free aqueous phase (e.g., potable water or seawater). In the later case, hydrophilic membranes including RO have little effects on removing endotoxic fragments by "size exclusion".

Treatment of Source Water

Based on the inventor's fractionation and distribution of proteins, the data reveal proteins comprise 70-80% (73% on average) as acidic (negatively charged) hydrophilic proteins with an average isoelectric point of about 5.5, and the remaining as mainly basic (positively charged) hydrophobic proteins with an average isoelectric point of about 9.2. Such distributions of proteins are nearly the same in effluent streams and in sludge (WWTP, FIG. 4) even though the concentration of proteins in sludge is over two orders of magnitude higher than that in effluent streams. As such, proteins are net negatively charged under the typically about neutral pH (e.g., 6.5-7.4) conditions in wastewater. Endotoxins are also negatively charged. Acidic proteins interact with endotoxins via mediators including the naturally present divalent cations (calcium and magnesium) in wastewater whereas basic proteins interact with endotoxins via both direct charge attractions and the strong tendency of hydrophobic groups to be excluded from water by clustering rather than extending into the aqueous phase. In order to separate the majority of proteins (acidic) that masks and cages endoxtoins within their inner structures, the phosphorylated parts of endotoxins and acidic proteins must be neutralized preferably by reducing the pH to within the isoelectric point of acidic proteins.

As such, in one embodiment of this invention, endotoxins are separated from acidic proteins in source water by using either an aluminum source or an iron source to reduce the pH of source water to within the isoelectric points of acidic proteins. An additional innovative purpose for the use of either the aluminum source or the iron source is to convert the naturally present bicarbonate in source water to carbon dioxide. The separated endotoxins and the converted carbon dioxide are then removed from source water by hydrophobic membranes to produce de-toxified and de-carbonated source water. Yet, a further innovative purpose for using either the aluminum source or the iron source is that the carried over trivalent cation (either aluminum or iron) with the de-toxified and de-carbonated source water is also utilized to precipitate foulants and sulfate upon mixing with calcium hydroxide (hydrated calcium oxide), and further upon mixing with an amine solvent.

Figure 5:
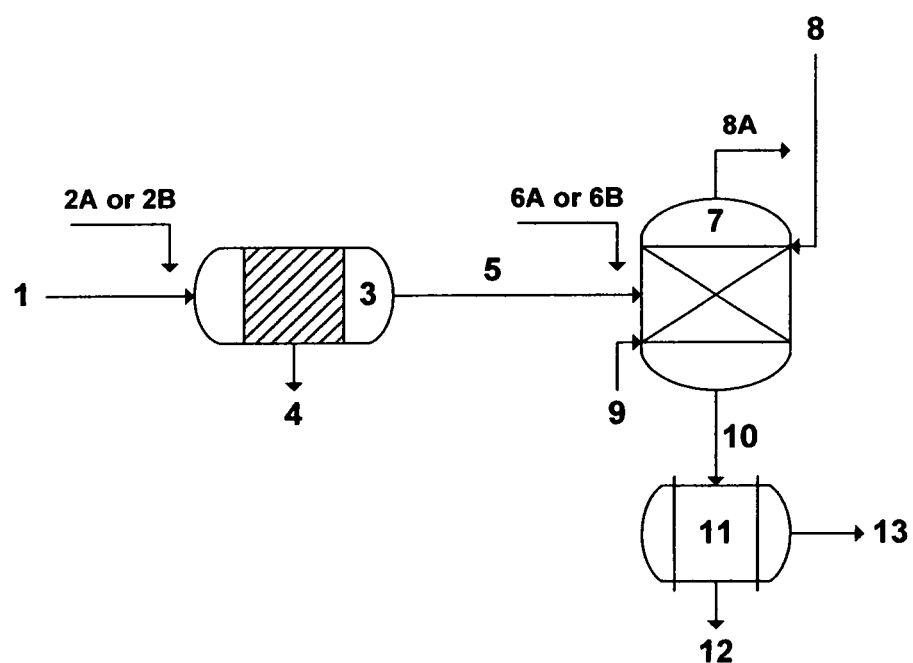
FIG. 5 illustrates a possible flow diagram for the invented methods.

Accordingly, FIG. 5 depicts an oversimplified flow diagram for the inventive method to treat source water. Source water [1] is mixed with either an aluminum source or an iron source [2A] to separate endotoxins from acidic proteins and convert the naturally present bicarbonate in source water to carbon dioxide. Hydrophobic membranes [3] are then used to remove endotoxins and carbon dioxide [4] from source to produce de-toxified and de-carbonated source water [5]. The aluminum source is selected from the group consisting of aluminum chloride, aluminum chlorohydrate, aluminum nitrate, aluminum sulfate, aluminum acetate, aluminum formate, and combinations thereof. The iron source is selected from the group consisting of iron chloride, iron chlorohydrate, iron nitrate, iron sulfate, iron acetate, iron formate, and combinations thereof. Other aluminum or iron sources may also be used in this invention. The de-toxified and de-carbonated source water [5] may be further treated to precipitate foulants and sulfate. As such, calcium hydroxide [6A] is mixed with the de-toxified and de-carbonated source water [5] to form precipitates comprising foulants and sulfate (either calcium sulfoaluminate upon mixing with the aluminum source or calcium sulfoferrate upon mixing with the iron source) in a precipitator unit [7]. Foulants comprise magnesium, phosphates, EPS, silica, boron, transition metals, and combinations thereof. The outlet stream [10] from the precipitator unit [7] is fed to a filter [11] to remove the precipitates [12] and produce de-fouled and de-sulfated source water [13]. An amine solvent [8] may also be fed to the precipitator unit [7] to accelerate precipitation by reaching a very high level of supersaturation within a very short period of time, which enormously simplifies the design of the precipitator unit [7] in terms of size (a compact modular design with a very short retention time) and effectiveness (a fast precipitation of either calcium sulfoaluminate or calcium sulfoferrate). The amine solvent is selected from the group consisting of isopropylamine, propylamine, dipropylamine, diisopropylamine, ethylamine, diethylamine, methylamine, dimethylamine, and combinations thereof. A gas [9] is fed near the bottom of the precipitator unit [7] to recover the amine solvent. The gas is selected from the group consisting of nitrogen, air, water vapor, and combinations thereof. The recovered amine solvent [8A] is recycled for reuse in the precipitator unit [7].

Endotoxins may also be separated from acidic proteins in source water by using calcium nitrate to reduce the pH of source water to within the isoelectric points of the acidic proteins. An additional innovative purpose for the use of calcium nitrate is to convert the naturally present bicarbonate in source water to carbon dioxide. Endotoxins and carbon dioxide are then removed from source water by hydrophobic membranes to produce de-toxified and de-carbonated source water. Yet, a further innovative purpose for the use of calcium nitrate is that the carried over divalent cation (calcium) with the de-toxified and de-carbonated source water is utilized to precipitate foulants and sulfate upon mixing with either aluminum hydroxide or iron hydroxide, and further upon mixing with an amine solvent.

As such, as also shown in FIG. 5, source water [1] is mixed with calcium nitrate [2B], to separate endotoxins from acidic proteins and convert the naturally present bicarbonate in source water to carbon dioxide. Hydrophobic membranes [3] are then used to remove endotoxins and carbon dioxide [4] from source water to produce de-toxified and de-carbonated source water [5]. The de-toxified and de-carbonated source water [5] may be further treated to precipitate foulants and sulfate. As such, either aluminum hydroxide or iron hydroxide [6B] is mixed the de-toxified and de-carbonated source water [5] to form precipitates comprising foulants and sulfate (either calcium sulfoaluminate upon mixing with aluminum hydroxide or calcium sulfoferrate upon mixing with iron hydroxide) in a precipitator unit [7]. Foulants comprise magnesium, phosphates, EPS, silica, boron, transition metals, and combinations thereof. The outlet stream [10] from the precipitator unit [7] is fed to a filter [11] to remove the precipitates [12] and produce de-fouled and de-sulfated source water [13]. An amine solvent [8] may also be fed to the precipitator unit [7] to enhance and accelerate precipitation. The amine solvent is selected from the group consisting of isopropylamine, propylamine, dipropylamine, diisopropylamine, ethylamine, diethylamine, methylamine, dimethylamine, and combinations thereof. A gas [9] is fed near the bottom of the precipitation unit [7] to recover the amine solvent. The gas is selected from the group consisting of nitrogen, air, water vapor, and combinations thereof. The recovered amine solvent [8A] is recycled for reuse in the precipitation unit [7].

In yet another embodiment, endotoxins are separated from acidic proteins in source water by using an amine solvent in an anionated form to reduce the pH of source water to within the isoelectric points of acidic proteins. An additional innovative purpose for the use of the amine solvent in the anionated form is to convert the naturally present bicarbonate in source water to carbon dioxide. The separated endotoxins and the converted carbon dioxide are then removed from source water by hydrophobic membranes to produce de-toxified and de-carbonated source water. Yet, a further innovative purpose for using the amine solvent in the anionated form is that the carried over amine solvent with the de-toxified and de-carbonated source water is regenerated and utilized to enhance the precipitation of foulants and sulfate upon mixing with calcium hydroxide and either aluminum hydroxide or iron hydroxide.

Figure 6:
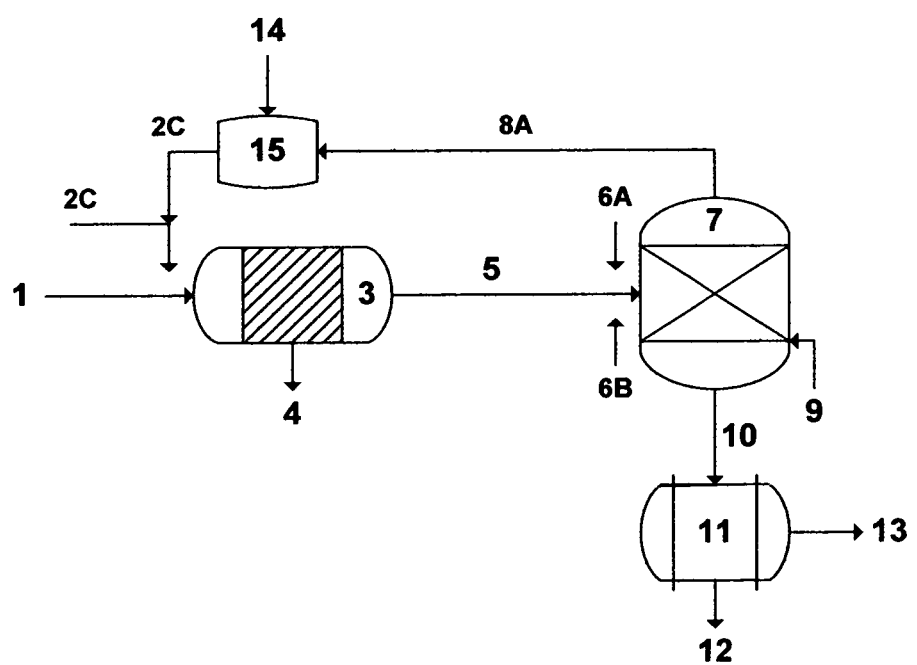
FIG. 6 illustrates another possible flow diagram for the invented methods.

Accordingly, and as shown in FIG. 6, source water [1] is mixed with an amine solvent in an anionated form [2C] to separate endotoxins from acidic proteins and convert the naturally present bicarbonate in source water to carbon dioxide. Hydrophobic membranes [3] are then used to remove endotoxins and carbon dioxide [4] from source to produce de-toxified and de-carbonated source water [5]. The amine solvent is selected from the group consisting of isopropylamine, propylamine, dipropylamine, diisopropylamine, ethylamine, diethylamine, methylamine, dimethylamine, and combinations thereof. The anionated form is selected from the group consisting of chloride, chlorohydrate, nitrate, sulfate, phosphate, acetate, formate, and combinations thereof. The de-toxified and de-carbonated source water [5] may be further treated to precipitate foulants and sulfate. As such, calcium hydroxide [6A], and either aluminum hydroxide or iron hydroxide [6B] are mixed with the de-toxified and de-carbonated source water [5] to regenerate the amine solvent from it is anionated form and to form precipitates comprising foulants and sulfate (either calcium sulfoaluminate upon mixing with aluminum hydroxide or calcium sulfoferrate upon mixing with iron hydroxide) in a precipitator unit [7]. The regenerated amine solvent within the precipitator unit [7] accelerates the precipitation of either calcium sulfoaluminate or calcium sulfoferrate by reaching a very high level of supersaturation within a very short period of time, which enormously simplifies the design of the precipitator unit [7] in terms of size and effectiveness. Foulants comprise magnesium, phosphates, EPS, silica, boron, transition metals, and combinations thereof. The outlet stream [10] from the precipitator unit [7] is fed to a filter [11] to remove the precipitates [12] and produce de-fouled and de-sulfated source water [13]. A gas [9] is fed near the bottom of the precipitator unit [7] to recover the amine solvent [8A]. The gas is selected from the group consisting of nitrogen, air, water vapor, and combinations thereof. The recovered amine solvent [8A] is reacted with an acid [14] in line (not shown in FIG. 6) or in a vessel [15] to produce the amine solvent in the anionated form [2C] for reuse in the inventive method. The acid is selected from the group consisting of hydrochloric acid, chloral hydrate, nitric acid, sulfuric acid, phosphoric acid, acetic acid, formic acid, and combinations thereof.

In yet another embodiment, endotoxins and foulants can be precipitated from source water by an amine solvent. Upon the innovative use of the amine solvent, the treated source water is simultaneously de-toxified by precipitating endotoxins, and de-fouled by precipitating foulants comprising magnesium, calcium, carbonate, phosphates, EPS, silica, boron, transition metals, and combinations thereof. Here, endotoxins are precipitated with the entire proteins, and the naturally present bicarbonate in source water is converted to carbonate and precipitated as such by the amine solvent. If desired, the de-toxified and de-fouled source water can further be de-sulfated upon mixing with calcium hydroxide and either aluminum hydroxide or iron hydroxide.

Figure 7:
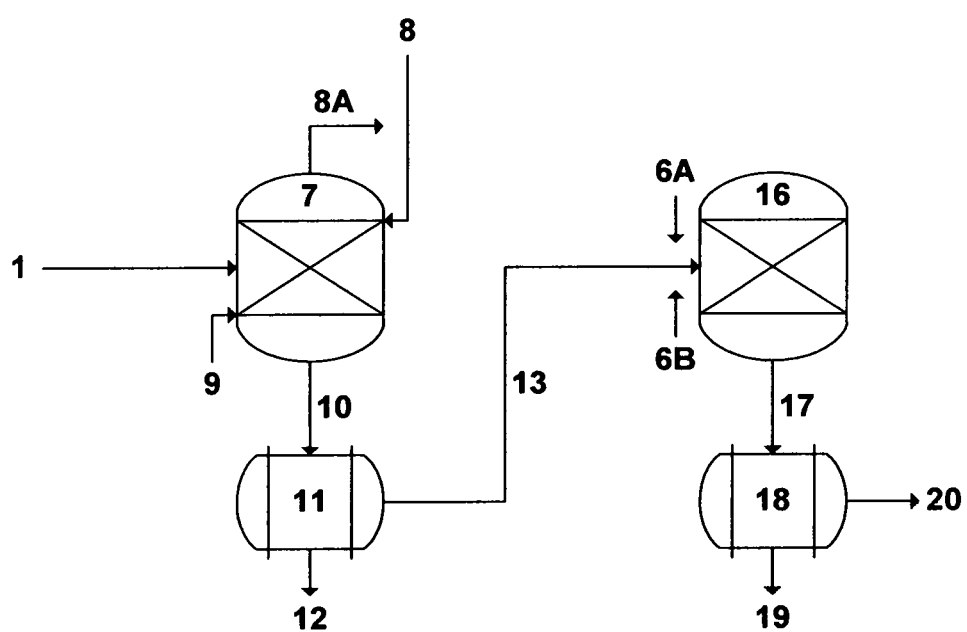
FIG. 7 illustrates a further possible flow diagram for the invented methods.

As such, and as depicted in FIG. 7, source water [1] is mixed with an amine solvent [8] in a first precipitator unit [7] to form first precipitates comprising endotoxins and foulants. A gas [9] is fed near the bottom of the first precipitator unit [7] to recover the amine solvent. The recovered amine solvent [8A] is recycled for reuse in the precipitation unit [7]. The outlet stream [10] from the first precipitator unit [7] is fed to a first filter [11] to remove the first precipitates [12] and produce de-toxified and de-fouled source water [13]. The amine solvent is selected from the group consisting of isopropylamine, propylamine, dipropylamine, diisopropylamine, ethylamine, diethylamine, methylamine, dimethylamine, and combinations thereof. The gas is selected from the group consisting of nitrogen, air, water vapor, and combinations thereof. Foulants comprise magnesium, calcium, carbonate, phosphates, extracellular polymeric substances (EPS), silica, boron, transition metals, and combinations thereof. If desired, sulfate is then precipitated from the de-toxified and de-fouled source water [13] by mixing with calcium hydroxide [6A], and either aluminum hydroxide or iron hydroxide [6B] to form second precipitates comprising either calcium sulfoaluminate (upon mixing with aluminum hydroxide) or calcium sulfoferrate (upon mixing with iron hydroxide) in a second precipitator unit [16]. The outlet stream [17] from the second precipitator unit [16] is fed to a second filter [18] to remove the second precipitates [19] and produce de-sulfated source water [20].

The precipitation of calcium ulfoaluminate or calcium sulfoferrate takes place based on the conditions under which it is effectively precipitated. Based on the inventor's testing, the removal of sulfate from source water in the form of either calcium sulfoaluminate or calcium sulfoferrate in all of the above embodiments is consistently over 97%. One structural formula that may generally describe certain embodiments of calcium sulfoaluminate or calcium sulfoferrate is as follows:

$$[Ca^{+2}]_A[SO_4^{-2}]_B[M^{+3}]_C[x\ H_2O]$$

where A is the stoichiometric amount of calcium ($Ca^{+2}$), B is stoichiometric amount of sulfate ($SO_4^{-2}$), C is the stoichiometric amount of the trivalent cation ($M^{+3}$; which is either aluminum: $Al^{+3}$ or iron: $Fe^{+3}$), and x is the hydration content. Depending on the amount of sulfate in source water, the chemistry of source water, and the basicity condition under which sulfate is precipitated in the form of either calcium sulfoaluminate or calcium sulfoferrate, the stoichiometric ratio (meq./L) of sulfate to calcium (B/A) is 0.2 to 0.5, the stoichiometric ratio (meq./L) of sulfate to the trivalent cation (13/C) is 0.5 to 1.5, and the hydration content (x) is 24 to 32.

Source water is selected from the group consisting of domestic wastewater, an effluent stream from a wastewater treatment plant, an effluent stream from a wastewater treatment and reclamation plant, a reverse osmosis reject stream from a wastewater treatment and reclamation plant, a nanofiltration reject stream from a wastewater treatment and reclamation plant, an ultrafiltration reject stream from a wastewater treatment and reclamation plant, a microfiltration reject stream from a wastewater treatment and reclamation plant, sludge thickening/dewatering reject streams from a wastewater treatment plant, sludge thickening/dewatering reject streams from a wastewater treatment and reclamation plant, produced water, agricultural drainage water, mine drainage water, and combinations thereof.

It should be noted that when source water, for example, comprises produced water, the hydrophobic membranes [3] as shown in FIGS. 5 and 6 would additionally serve as a de-oiling step. The immiscibility of oil content in such source water allows it to permeate through the hydrophobic membranes (as a membranes' wetting fluid) whereas the hydrophobic membranes repel water (as a membranes' non-wetting fluid) [e.g., Bader, U.S. Pat. Nos. 6,365,051; 7,789,159; 7,934,551; 7,963,338; and 8,915,301]. The treated water by the inventive methods may then be used, for example, as: (1) low salinity fracturing water in shale and sand formations; (2) injecting water for improved oil recovery; and (3) feeding water to generate steam for enhanced oil recovery.

TABLE 1

Effluent and RO Reject Streams from WWTRP.

| Species (mg/L) | Activated Sludge Effluent Stream Average (Range) | RO Reject Stream Average (Range) |
|---|---|---|
| $Na^+$ | 156.3 (124.2-204.9) | 950.9 (573.0-1,275.0) |
| $K^+$ | 12.6 (11.3-14.6) | 79.8 (69.0-92.6) |
| $Mg^{+2}$ | 11.9 (9.4-14.7) | 76.2 (58.9-90.5) |
| $Ca^{+2}$ | 45.0 (40.3-52.5) | 290.8 (244.6-328.7) |
| $Sr^{+2}$ | 0.61 (0.47-0.70) | 3.7 (3.0-4.1) |
| $Ba^{+2}$ | 0.02 (0.01-0.03) | 0.12 (0.06-0.14) |
| $Fe^{+2}$ | 0.08 (0.01-0.20) | 0.14 (0.11-0.25) |
| $Cl^-$ | 239.7 (156.9-370.1) | 1,462.2 (937.2-1,962.9) |
| $HCO_3^-$ | 97.8 (69.8-125.2) | 416.6 (328.7-582.5) |
| $NO_3^-$ | 2.8 (1.4-4.5) | 13.4 (3.0-19.0) |
| $SO_4^{-2}$ | 120.3 (104.8-149.7) | 760.1 (606.3-868.6) |
| $PO_4^{-3}$ | 8.6 (2.6-14.5) | 47.7 (36.8-66.7) |
| TP | 11.5 (8.8-16.1) | 63.6 (48.7-88.4) |
| $SiO_2$ | 2.1 (1.6-2.5) | 13.3 (9.9-15.8) |
| B | 0.27 (0.19-0.36) | 0.57 (0.25-0.73) |
| TDS | 690.8 (564.9-821.5) | 4,096.9 (3,251.0-4,753.5) |
| TH | 161.5 (139.4-178.5) | 1,040.6 (854.1-1,190.0) |
| COD | 319.0 (155.0-690.0) | 379.0 (168.0-789.0) |
| pH | 6.7 (6.5-7.3) | 7.1 (6.8-7.8) |
| T (° C.) | | 39 (35-40) |

TH: Total Hardness.

TABLE 2

Endotoxins in WWTRP and WWTP with Recycling Rejects.

| Stream | Endotoxins (EU/mL) | Flow Rate (m³/day) | Endotoxins Load (EU/day) |
|---|---|---|---|
| WWTRP with Recycling to Influent | | | |
| Influent [I] | 3,400 | 375,000 | 1.28E15 |
| Recycled to Influent | 24,900 | 57,450 | 1.43E15 |
| UF Reject [UF-R] | 28,600 | 41,700 | 1.19E15 |
| Thickener Reject [T-R] | 16,100 | 12,750 | 2.05E14 |
| Dewatering Reject [D-R] | 10,700 | 3,000 | 3.21E13 |
| Mixed Influent [MI] | 6,200 | 432,450 | 2.68E15 |
| Effluent [E] | 5,200 | 416,700 | 2.17E15 |
| UF Product [UF-P] | 2,600 | 375,000 | 9.75E14 |
| RO Product [RO-P] | 400 | 318,750 | 1.28E14 |
| RO Reject [RO-R] (Disposal) | 15,100 | 56,250 | 8.49E14 |
| WWTP with Recycling to Influent | | | |
| Influent [I] | 3,400 | 375,000 | 1.28E15 |
| Recycled to Influent | 9,100 | 13,000 | 1.18E14 |
| Thickener Reject [T-R] | 9,600 | 10,800 | 1.04E14 |
| Dewatering Reject [D-R] | 6,300 | 2,200 | 1.39E13 |

TABLE 2-continued

Endotoxins in WWTRP and WWTP with Recycling Rejects.

| Stream | Endotoxins (EU/mL) | Flow Rate (m³/day) | Endotoxins Load (EU/day) |
|---|---|---|---|
| Mixed Influent [MI] | 3,600 | 388,000 | 1.40E15 |
| Effluent [E] | 2,600 | 376,000 | 9.78E14 |

TABLE 3

Endotoxins in WWTRP with Partial Recycling and without Recycling Rejects.

| Stream | Endotoxins (EU/mL) | Flow Rate (m³/day) | Endotoxins Load (EU/day) |
|---|---|---|---|
| WWTRP with Partial Recycling to Influent (as in WWTP) | | | |
| Influent [I] | 3,400 | 375,000 | 1.28E15 |
| Recycled to Influent | 9,100 | 13,000 | 1.18E14 |
| Thickener Reject [T-R] | 9,600 | 10,800 | 1.04E14 |
| Dewatering Reject [D-R] | 6,300 | 2,200 | 1.39E13 |
| Mixed Influent [MI] | 3,600 | 388,000 | 1.40E15 |
| Effluent [E] | 2,600 | 376,000 | 9.78E14 |
| UF Product [UF-P] | 1,300 | 338,400 | 4.40E14 |
| RO Product [RO-P] | 250 | 287,600 | 7.19E13 |
| Combined Rejects (Disposal) | 10,300 | 88,400 | 9.06E14 |
| UF Reject [UF-R] | 14,300 | 37,600 | 5.38E14 |
| RO Reject [RO-R] | 7,250 | 50,800 | 3.68E14 |
| WWTRP without Recycling to Influent | | | |
| Influent [I] | 3,400 | 375,000 | 1.28E15 |
| Effluent [E] | 2,400 | 356,000 | 8.54E14 |
| UF Product [UF-P] | 1,200 | 320,400 | 3.84E14 |
| RO Product [RO-P] | 200 | 272,300 | 5.45E13 |
| Combined Rejects (Disposal) | 9,400 | 94,300 | 8.85E14 |
| UF Reject [UF-R] | 13,200 | 35,600 | 4.70E14 |
| RO Reject [RO-R] | 6,800 | 48,100 | 3.27E14 |
| Thickener Reject [T-R] | 8,900 | 8,600 | 7.65E13 |
| Dewatering Reject [D-R] | 5,900 | 2,000 | 1.19E13 |

What is claimed is:

1. A method for treating source water, said method comprising the steps of: (i) separating endotoxins and carbon dioxide from said source water by (a) mixing an aluminum source or an iron source with said source water to separate said endotoxins from acidic proteins and convert naturally present bicarbonate in said source water to said carbon dioxide; and (b) removing said endotoxins and said carbon dioxide from said source water by hydrophobic membranes to produce de-toxified and de-carbonated source water; and (ii) separating foulants and sulfate from said de-toxified and de-carbonated source water by (a) mixing calcium hydroxide with said de-toxified and de-carbonated source water to form precipitates comprising calcium sulfoaluminate or calcium sulfoferrate in a precipitator unit; and (ii) removing said precipitates by a filter.

2. The method of claim 1, wherein said aluminum source is selected from the group consisting of aluminum chloride, aluminum chlorohydrate, aluminum nitrate, aluminum sulfate, aluminum acetate, aluminum formate, and combinations thereof.

3. The method of claim 1, wherein said iron source is selected from the group consisting of iron chloride, iron chlorohydrate, iron nitrate, iron sulfate, iron acetate, iron formate, and combinations thereof.

4. The method of claim 1, wherein said foulants comprise magnesium, phosphates, extracellular polymeric substances (EPS), silica, boron, transition metals, and combinations thereof.

5. The method of claim 1, wherein step (ii)(a) further comprises the step of mixing an amine solvent, said amine solvent is selected from the group consisting of isopropylamine, propylamine, dipropylamine, diisopropylamine, ethylamine, diethylamine, methylamine, dimethylamine, and combinations thereof.

6. The method of claim 5, comprising the step of recovering said amine solvent by a gas, said gas is selected from the group consisting of nitrogen, air, water vapor, and combination thereof.

7. The method of claim 1, wherein said source water is selected from the group consisting of domestic wastewater, an effluent stream from a wastewater treatment plant, an effluent stream from a wastewater treatment and reclamation plant, a reverse osmosis reject stream from a wastewater treatment and reclamation plant, a nanofiltration reject stream from a wastewater treatment and reclamation plant, an ultrafiltration reject stream from a wastewater treatment and reclamation plant, a microfiltration reject stream from a wastewater treatment and reclamation plant, sludge thickening/dewatering reject streams from a wastewater treatment plant, sludge thickening/dewatering reject streams from a wastewater treatment and reclamation plant, produced water, agricultural drainage water, mine drainage water, and combinations thereof.

8. A method for treating source water, said method comprising the steps of: (i) separating endotoxins and carbon dioxide from said source water by (a) mixing calcium nitrate with said source water to separate said endotoxins from acidic proteins and convert naturally present bicarbonate in said source water to said carbon dioxide; and (b) removing said endotoxins and said carbon dioxide from said source water by hydrophobic membranes to produce de-toxified
and de-carbonated source water; and (ii) separating foulants and sulfate from said de-toxified and de-carbonated source water by (a) mixing aluminum hydroxide or iron hydroxide with said de-toxified and de-carbonated source water to form precipitates comprising either calcium sulfoaluminate or calcium sulfoferrate in a precipitator unit; and (b) removing said precipitates by a filter.

9. The method of claim 8, wherein said foulants comprise magnesium, phosphates, extracellular polymeric substances (EPS), silica, boron, transition metals, and combinations thereof.

10. The method of claim 8, wherein step (ii)(a) further comprises the step of mixing an amine solvent, said amine solvent is selected from the group consisting of isopropylamine, propylamine, dipropylamine, diisopropylamine, ethylamine, diethylamine, methylamine, dimethylamine, and combinations thereof.

11. The method of claim 10, comprising the step of recovering said amine solvent by a gas, said gas is selected from the group consisting of nitrogen, air, water vapor, and combinations thereof.

12. The method of claim 8, wherein said source water is selected from the group consisting of domestic wastewater, an effluent stream from a wastewater treatment plant, an effluent stream from a wastewater treatment and reclamation plant, a reverse osmosis reject stream from a wastewater treatment and reclamation plant, a nanofiltration reject stream from a wastewater treatment and reclamation plant, an ultrafiltration reject stream from a wastewater treatment and reclamation plant, a microfiltration reject stream from a wastewater treatment and reclamation plant, sludge thickening/dewatering reject streams from a wastewater treatment plant, sludge thickening/dewatering reject streams from a wastewater treatment and reclamation plant, produced water, agricultural drainage water, mine drainage water, and combinations thereof.

13. A method for treating source water, said method comprising the steps of: (i) separating endotoxins and carbon dioxide from said source water by (a) mixing an amine solvent in an anionated form with said source water to separate said endotoxins from acidic proteins and convert naturally present bicarbonate in said source water to said carbon dioxide; and (b) removing said endotoxins and said carbon dioxide from said source water by hydrophobic membranes to produce de-toxified and de-carbonated source water; and (ii) separating foulants and sulfate from said de-toxified and de-carbonated source water by (a) mixing calcium hydroxide, and aluminum hydroxide or iron hydroxide, with said de-toxified and de-carbonated source water to regenerate said amine solvent and to form precipitates comprising calcium sulfoaluminate or calcium sulfoferrate in a precipitator unit; and (b) removing said precipitates by a filter.

14. The method of claim 13, wherein said amine solvent is selected from the group consisting of isopropylamine, propylamine, dipropylamine, diisopropylamine, ethylamine, diethylamine, methylamine, dimethylamine, and combinations thereof.

15. The method of claim 13, wherein said anionated form is selected from the group consisting of chloride, chlorohydrate, nitrate, sulfate, phosphate, acetate, formate, and combinations thereof.

16. The method of claim 13, wherein said foulants comprise magnesium, phosphates, extracellular polymeric substances (EPS), silica, boron, transition metals, and combinations thereof.

17. The method of claim 13, comprising the step of recovering said amine solvent by a gas, said gas is selected from the group consisting of nitrogen, air, water vapor, and combinations thereof.

18. The method of claim 17, comprising the step of reacting the recovered said amine solvent with an acid to produce said amine solvent in said anionated form.

19. The method of claim 18, wherein said acid is selected from the group consisting of hydrochloric acid, chloral hydrate, nitric acid, sulfuric acid, phosphoric acid, acetic acid, formic acid, and combinations thereof.

20. The method of claim 13, wherein said source water is selected from the group consisting of domestic wastewater, an effluent stream from a wastewater treatment plant, an effluent stream from a wastewater treatment and reclamation plant, a reverse osmosis reject stream from a wastewater treatment and reclamation plant, a nanofiltration reject stream from a wastewater treatment and reclamation plant, an ultrafiltration reject stream from a wastewater treatment and reclamation plant, a microfiltration reject stream from a wastewater treatment and reclamation plant, sludge thickening/dewatering reject streams from a wastewater treatment plant, sludge thickening/dewatering reject streams from a wastewater treatment and reclamation plant, produced water, agricultural drainage water, mine drainage water, and combinations thereof.

21. A method for treating source water, said method comprising the steps of: (i) separating endotoxins and foulants from said source water by (a) mixing an amine solvent with said source water to form first precipitates comprising said endotoxins and said foulants in a first precipitator unit; and (b) removing said first precipitates by a first filter to produce de-toxified and de-fouled source water; and (ii) separating sulfate from said de-toxified and de-fouled source water by (a) mixing said de-toxified and de-fouled source water with calcium hydroxide, and aluminum hydroxide or iron hydroxide, to form second precipitates comprising calcium sulfoaluminate or calcium sulfoferrate in a second precipitator unit; and (b) removing said second precipitates by a second filter.

22. The method of claim 21, wherein said amine solvent is selected from the group consisting of isopropylamine, propylamine, dipropylamine, diisopropylamine, ethylamine, diethylamine, methylamine, dimethylamine, and combinations thereof.

23. The method of claim 21, comprising the step of recovering said amine solvent by a gas, said gas is selected from the group consisting of nitrogen, air, water vapor, and combinations thereof.

24. The method of claim 21, wherein said foulants comprise magnesium, calcium, carbonate, phosphates, extracellular polymeric substances (EPS), silica, boron, transition metals, and combinations thereof.

25. The method of claim 21, wherein said source water is selected from the group consisting of domestic wastewater, an effluent stream from a wastewater treatment plant, an effluent stream from a wastewater treatment and reclamation plant, a reverse osmosis reject stream from a wastewater treatment and reclamation plant, a nanofiltration reject stream from a wastewater treatment and reclamation plant, an ultrafiltration reject stream from a wastewater treatment and reclamation plant, a microfiltration reject stream from a wastewater treatment and reclamation plant, sludge thickening/dewatering reject streams from a wastewater treatment plant, sludge thickening/dewatering reject streams from a wastewater treatment and reclamation plant, produced water, agricultural drainage water, mine drainage water, and combinations thereof.

\* \* \* \* \*